US008844346B1

(12) United States Patent
Singh et al.

(10) Patent No.: US 8,844,346 B1
(45) Date of Patent: Sep. 30, 2014

(54) TIRE LOAD ESTIMATION SYSTEM USING ROAD PROFILE ADAPTIVE FILTERING

(71) Applicant: The Goodyear Tire & Rubber Company, Akron, OH (US)

(72) Inventors: Kanwar Bharat Singh, Stow, OH (US); Anthony William Parsons, Dommeldange (LU); Marc Engel, Bissen (LU); Peter Jung-min Suh, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/789,881

(22) Filed: Mar. 8, 2013

(51) Int. Cl.
*G01M 17/02* (2006.01)
*B60C 23/06* (2006.01)
*G07C 5/08* (2006.01)

(52) U.S. Cl.
CPC ............ *B60C 23/064* (2013.01); *G07C 5/0808* (2013.01); *G01M 17/02* (2013.01)
USPC .......... 73/146; 73/146.5; 701/30.8; 701/31.1; 701/34.4; 701/36

(58) Field of Classification Search
USPC ............... 701/36, 37, 41, 48, 124, 29.1, 31.4, 701/34.4, 72; 702/34, 35, 189; 73/146, 73/146.2; 152/151; 340/442, 443
See application file for complete search history.

(56) References Cited

U.S. PATENT DOCUMENTS

| | | | | |
|---|---|---|---|---|
| 5,260,683 | A * | 11/1993 | Tanaka et al. | 340/448 |
| 5,553,491 | A * | 9/1996 | Naito et al. | 73/146.5 |
| 5,826,207 | A * | 10/1998 | Ohashi et al. | 701/36 |
| 6,539,295 | B1 * | 3/2003 | Katzen et al. | 701/33.6 |
| 6,962,075 | B2 * | 11/2005 | Bertrand | 73/146 |
| 7,240,542 | B2 * | 7/2007 | Gustafsson et al. | 73/146 |
| 7,404,317 | B2 * | 7/2008 | Mancosu et al. | 73/146 |
| 7,415,874 | B2 * | 8/2008 | Mancosu et al. | 73/146.5 |
| 7,546,764 | B2 | 6/2009 | Morinaga et al. | 73/146 |
| 7,549,327 | B2 * | 6/2009 | Breed | 73/146 |
| 7,552,628 | B2 | 6/2009 | Mancosu et al. | 73/146 |
| 7,681,960 | B2 * | 3/2010 | Wanke et al. | 303/146 |
| 7,856,871 | B2 * | 12/2010 | Mancosu et al. | 73/146.5 |
| 7,908,918 | B2 * | 3/2011 | Brusarosco et al. | 73/146.5 |

(Continued)

FOREIGN PATENT DOCUMENTS

| | | |
|---|---|---|
| EP | 1661737 | 5/2006 |
| EP | 1757464 | 2/2007 |

(Continued)

OTHER PUBLICATIONS

European Search Report received by Applicants Jun. 11, 2014.

*Primary Examiner* — Thomas Tarcza
*Assistant Examiner* — Tyler J Lee
(74) *Attorney, Agent, or Firm* — Richard B. O'Planick

(57) ABSTRACT

A dynamic load estimation system is provided including: a vehicle load bearing tire; at least one tire sensor mounted to the tire, the sensor operable to measure a tire deformation of the one tire and generate a raw load-indicating signal conveying measured deformation data; road roughness estimation means for determining a road roughness estimation; filtering means for filtering the measured deformation data by the road roughness estimation; and load estimation means for estimating an estimated load on the one tire from filtered measured deformation data. A road profile estimate is fused with the static load estimate in order to obtain an instantaneous tire load estimate.

20 Claims, 39 Drawing Sheets

(56) References Cited

U.S. PATENT DOCUMENTS

| | | | |
|---|---|---|---|
| 7,945,361 B2 * | 5/2011 | Brusarosco et al. | 701/36 |
| 7,954,367 B2 * | 6/2011 | Mancosu et al. | 73/146 |
| 8,051,705 B2 * | 11/2011 | Kobayakawa | 73/146 |
| 8,155,798 B2 * | 4/2012 | Seiniger et al. | 701/1 |
| 8,316,700 B2 * | 11/2012 | Brusarosco et al. | 73/146 |
| 8,371,159 B2 * | 2/2013 | Morinaga | 73/146 |
| 8,483,976 B2 * | 7/2013 | Morinaga | 702/34 |
| 2002/0162389 A1 * | 11/2002 | Yokota et al. | 73/146 |
| 2003/0058118 A1 * | 3/2003 | Wilson | 340/679 |
| 2003/0121319 A1 * | 7/2003 | Kojima et al. | 73/146.2 |
| 2007/0255510 A1 * | 11/2007 | Mancosu et al. | 702/34 |
| 2008/0103659 A1 | 5/2008 | Mancosu et al. | 701/41 |
| 2009/0055040 A1 | 2/2009 | Nagaya | 701/29 |

FOREIGN PATENT DOCUMENTS

| | | | |
|---|---|---|---|
| EP | 2301769 | 3/2011 | |
| JP | 2005-249525 | 9/2005 | |
| WO | 02/92364 | 11/2002 | |
| WO | 03/022651 | 3/2003 | |
| WO | 2011/054363 | 5/2011 | B60G 17/0165 |

* cited by examiner

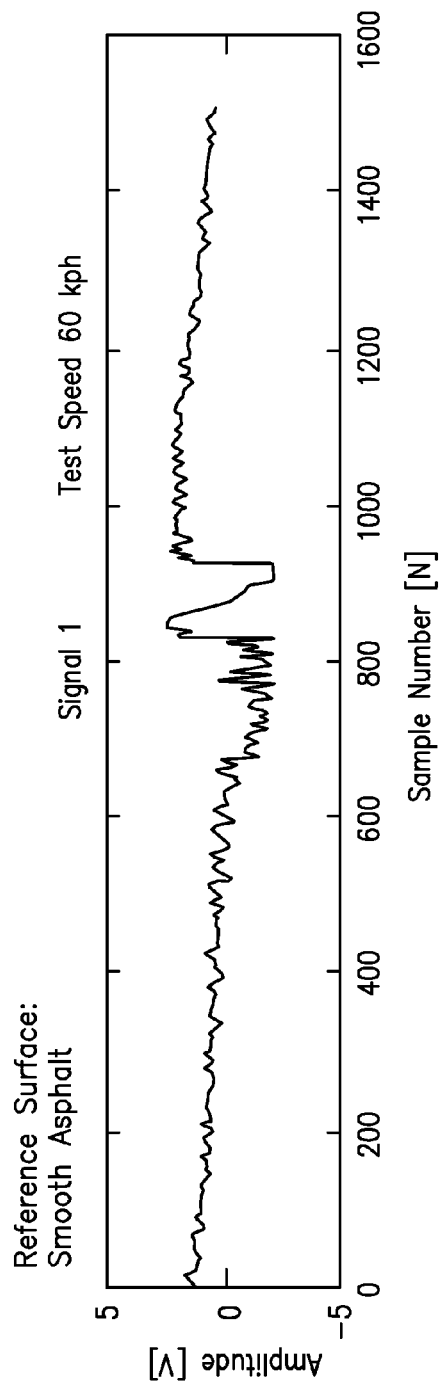
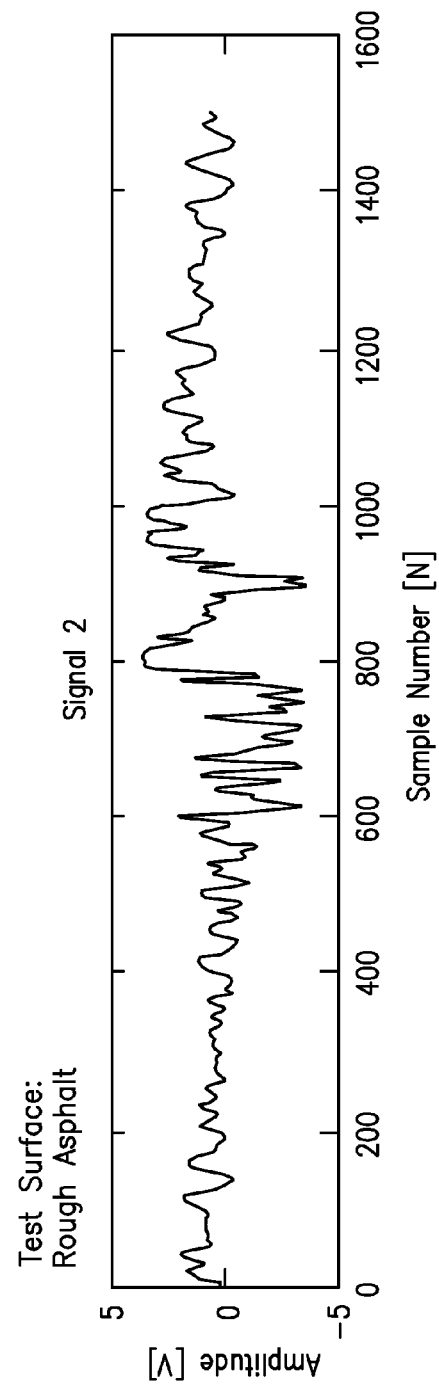
FIG-7A
FIG-7B

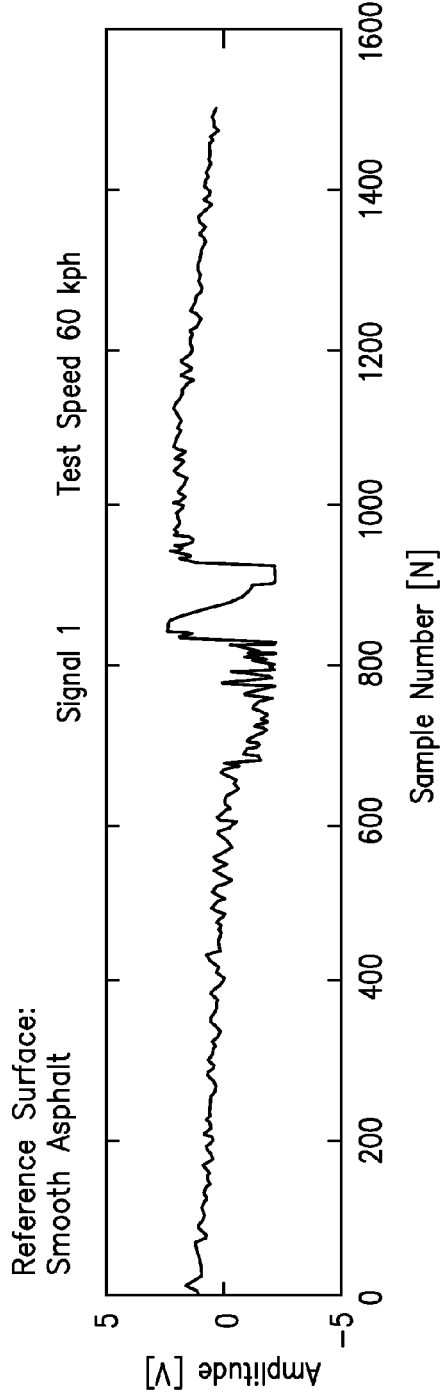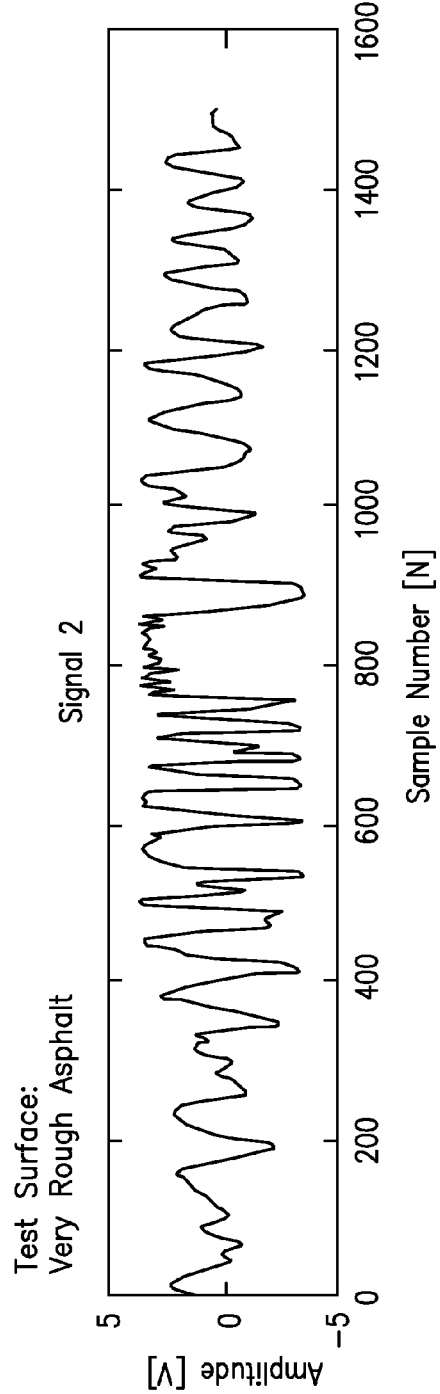

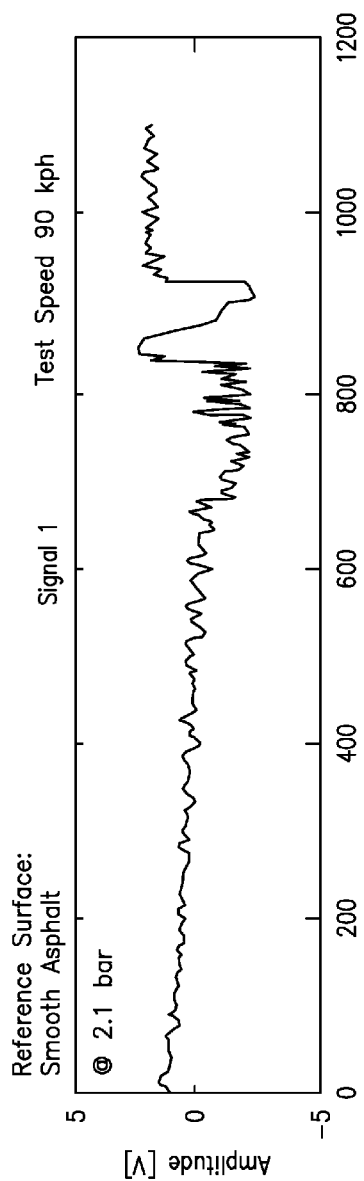
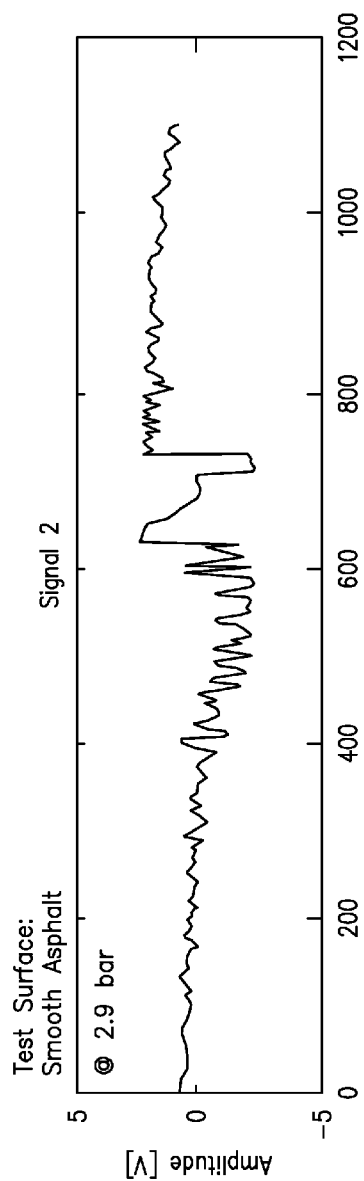
FIG-9A
FIG-9B

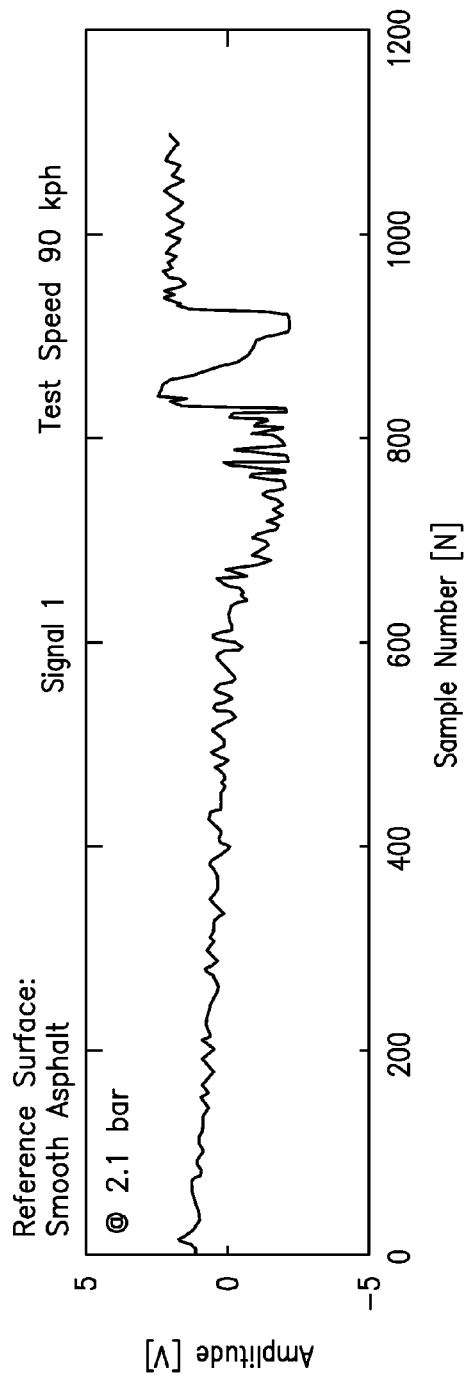
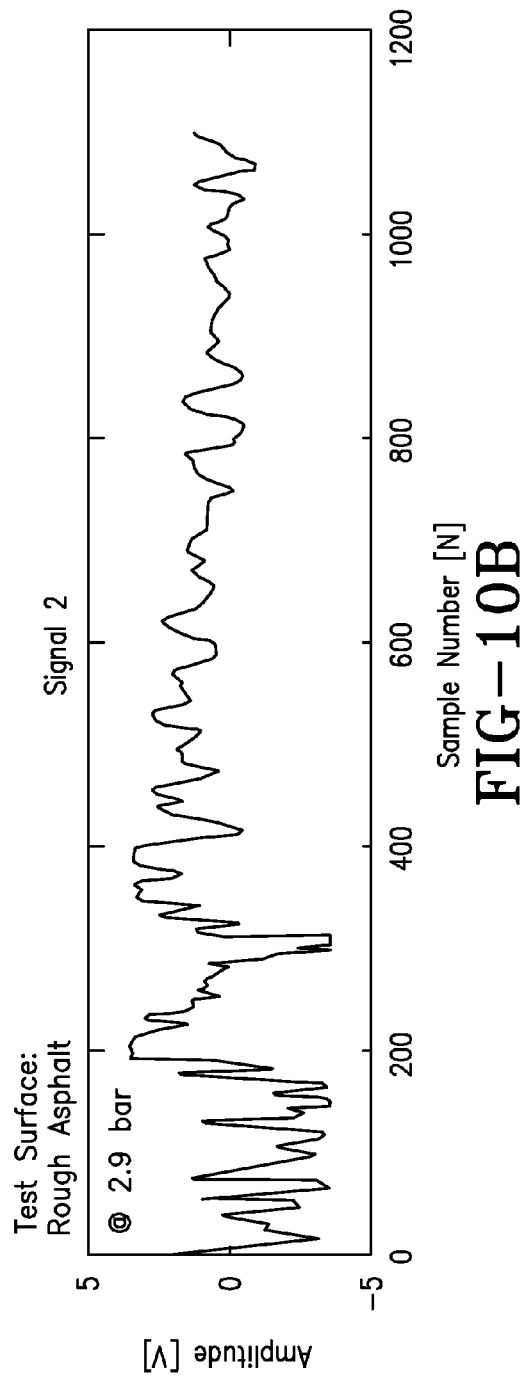
FIG-10A
FIG-10B

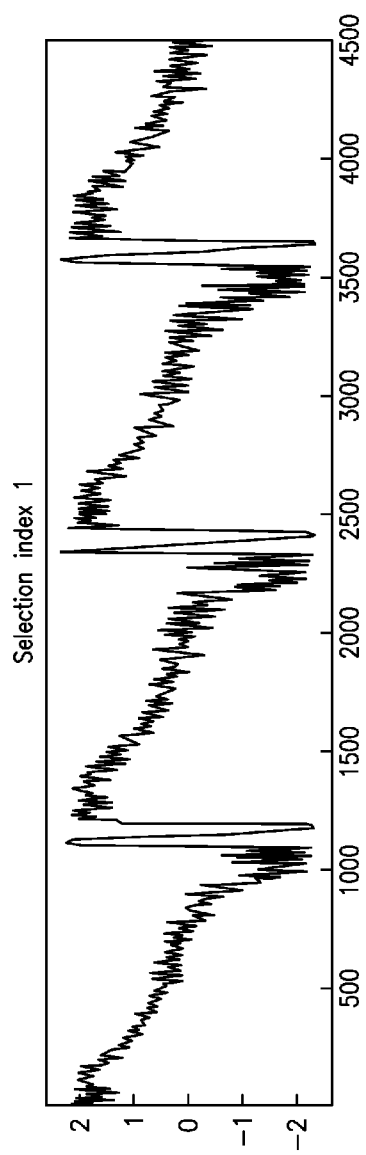
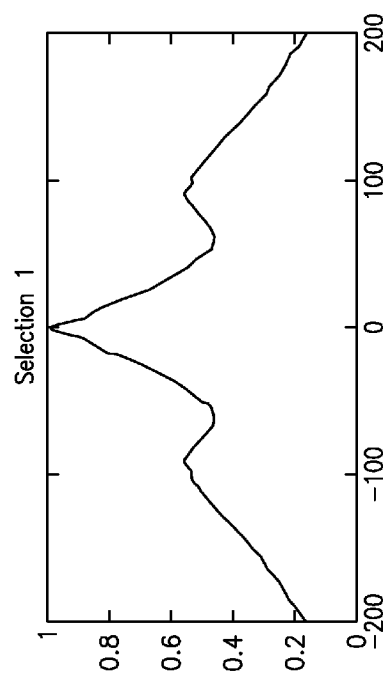
FIG-17A
FIG-17B

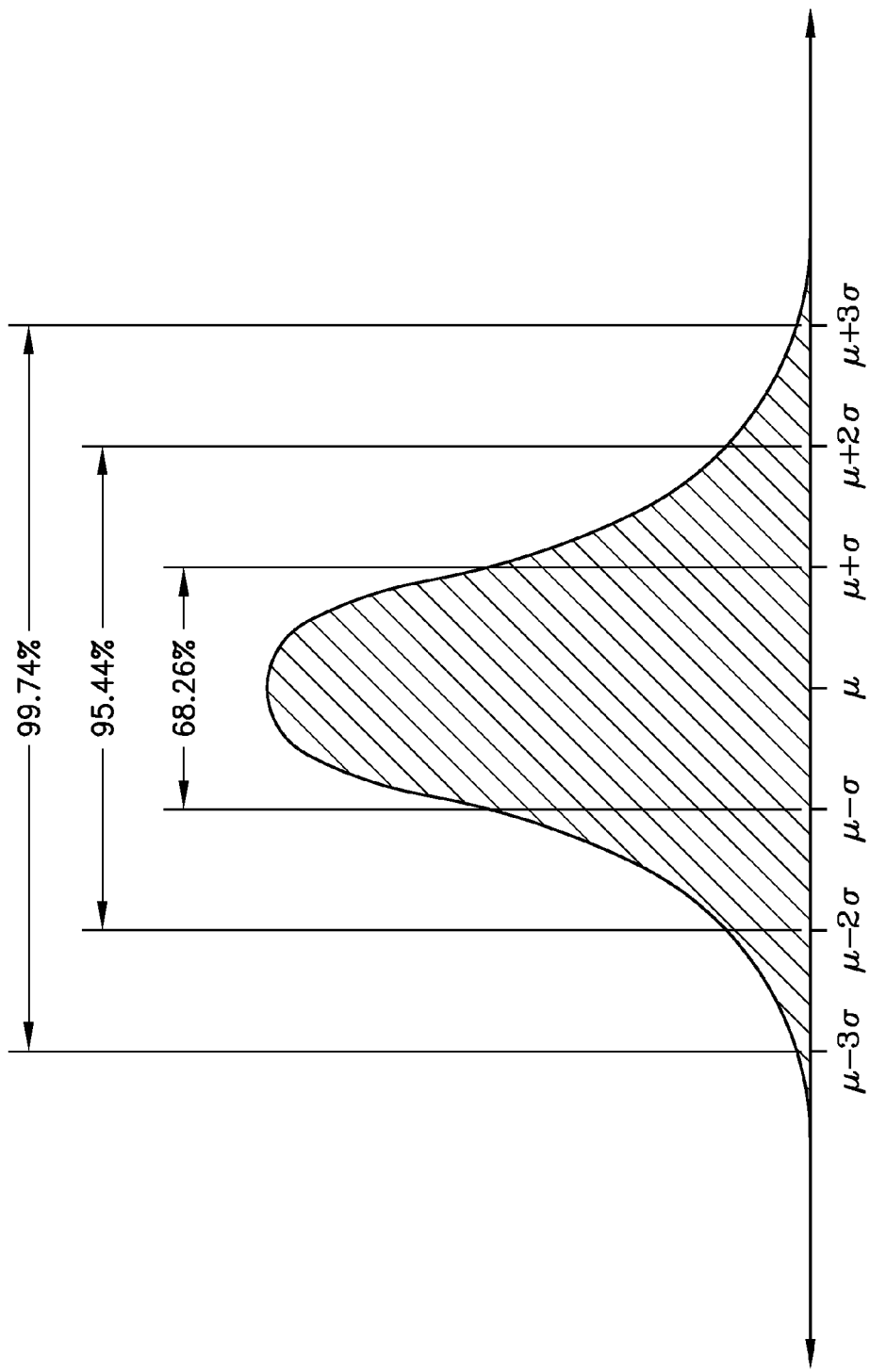

US 8,844,346 B1

TIRE LOAD ESTIMATION SYSTEM USING ROAD PROFILE ADAPTIVE FILTERING

FIELD OF THE INVENTION

The invention relates generally to tire monitoring systems for collecting measured tire parameter data during vehicle operation and, more particularly, to systems and method generating for estimating tire loading based upon the measured tire parameter data.

BACKGROUND OF THE INVENTION

Vehicle-mounted tires may be monitored by tire pressure monitoring systems (TPMS) which measure tire parameters such as pressure and temperature during vehicle operation. Data from TPMS tire-equipped systems is used to ascertain the status of a tire based on measured tire parameters and alert the driver of conditions, such as low tire pressure or leakage, which may require remedial maintenance. Sensors within each tire are either installed at a pre-cure stage of tire manufacture or in a post-cure assembly to the tire.

Other factors such as tire loading are important considerations for vehicle operation and safety. It is accordingly further desirable to estimate tire loading under real time and driving conditions and communicate load information to a vehicle operator and/or vehicle systems such as braking in conjunction with the aforementioned measured tire parameters of pressure and temperature.

SUMMARY OF THE INVENTION

According to an aspect of the invention, a dynamic load estimation system is provided including: a vehicle load bearing tire; at least one tire sensor mounted to the tire, the sensor operable to measure a tire deformation of the one tire and generate a raw load-indicating signal conveying measured deformation data; road roughness estimation means for determining a road roughness estimation; unfiltered load estimating means for generating a static load estimation from the raw load-indicating signal, filtering means for filtering the static load estimation by the road roughness estimation; and load estimation means for estimating an estimated load on the one tire on the basis of the filtered load estimation.

In a further aspect, the tire sensor functions in the configuration of as an energy harvesting device that generates a signal responsive to tire deformation.

According to a further aspect, the filtering means is configured as an adaptive filter such as an adaptive Kalman filter using a recursive-based procedure. The adaptive Kalman filter generates from the unfiltered tire footprint length estimate a footprint length estimation that is adaptively filtered by a road roughness estimation. The filtered footprint length, together with measured tire inflation pressure and tire identification data, are then used to extract an estimated tire load from a tire-specific database. In a first embodiment, the road roughness estimation means operatively applies a surface roughness classification system to the raw load-indicating signal to determine a relative road roughness estimation. The filtering means then operates to filter the measured deformation data by the relative road roughness estimation. Data from the vehicle-mounted sensors is used in an adaptive filter and applied to a static load estimate from the tire to generate a road profile height estimation and a load variation estimate. The estimated road profile height is operatively fused with the filtered load estimation to yield a calculated instantaneous tire load estimation.

DEFINITIONS

"ANN" or "Artificial Neural Network" is an adaptive tool for non-linear statistical data modeling that changes its structure based on external or internal information that flows through a network during a learning phase. ANN neural networks are non-linear statistical data modeling tools used to model complex relationships between inputs and outputs or to find patterns in data.

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"CAN bus" is an abbreviation for controller area network.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact created by the tire tread with a flat surface as the tire rotates or rolls.

"Groove" means an elongated void area in a tire wall that may extend circumferentially or laterally about the tire wall. The "groove width" is equal to its average width over its length. A grooves is sized to accommodate an air tube as described.

"Inboard side" means the side of the tire nearest the vehicle when the tire is mounted on a wheel and the wheel is mounted on the vehicle.

"Kalman Filter" is a set of mathematical equations that implement a predictor-corrector type estimator that is optimal in the sense that it minimizes the estimated error covariance—when some presumed conditions are met.

"Lateral" means an axial direction.

"Lateral edges" means a line tangent to the axially outermost tread contact patch or footprint as measured under normal load and tire inflation, the lines being parallel to the equatorial centerplane.

"Luenberger Observer" is a state observer or estimation model. A "state observer" is a system that provide an estimate of the internal state of a given real system, from measurements of the input and output of the real system. It is typically computer-implemented, and provides the basis of many practical applications.

"MSE" is an abbreviation for Mean square error, the error between and a measured signal and an estimated signal which the Kalman Filter minimizes.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Piezoelectric Film Sensor" a device in the form of a film body that uses the piezoelectric effect actuated by a bending of the film body to measure pressure, acceleration, strain or force by converting them to an electrical charge.

"PSD" is Power Spectral Density (a technical name synonymous with FFT (Fast Fourier Transform).

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 7A is a graph showing reference signal data for one tire rotation under smooth asphalt conditions at 60 kph.

FIG. 7B is a graph showing test data for one tire rotation under rough asphalt conditions at 60 kph.

FIG. 8A is a graph showing reference data for one tire rotation under smooth asphalt conditions at 60 kph.

FIG. 8B is a graph showing test data for one tire rotation under very rough asphalt conditions at 60 kph.

FIG. 9A is a graph showing reference signal data for one tire rotation under smooth asphalt conditions at 90 kph.

FIG. 9B is a graph showing test signal data for one tire rotation under smooth asphalt conditions at 90 kph.

FIG. 10A is a graph showing reference signal data for one tire rotation under smooth asphalt conditions at 90 kph.

FIG. 10B is a graph showing test signal data for one tire rotation under smooth asphalt conditions at 9 kph.

FIG. 17A shows a selection 1 Visualization of Selected Data graph for the Autocorrelation Coefficient.

FIG. 17B shows a statistical graph for the data of FIG. 17A.

FIG. 21 is a normal distribution curve showing the dependency of standard deviation on surface roughness level.

DETAILED DESCRIPTION OF THE INVENTION

Figure 1:
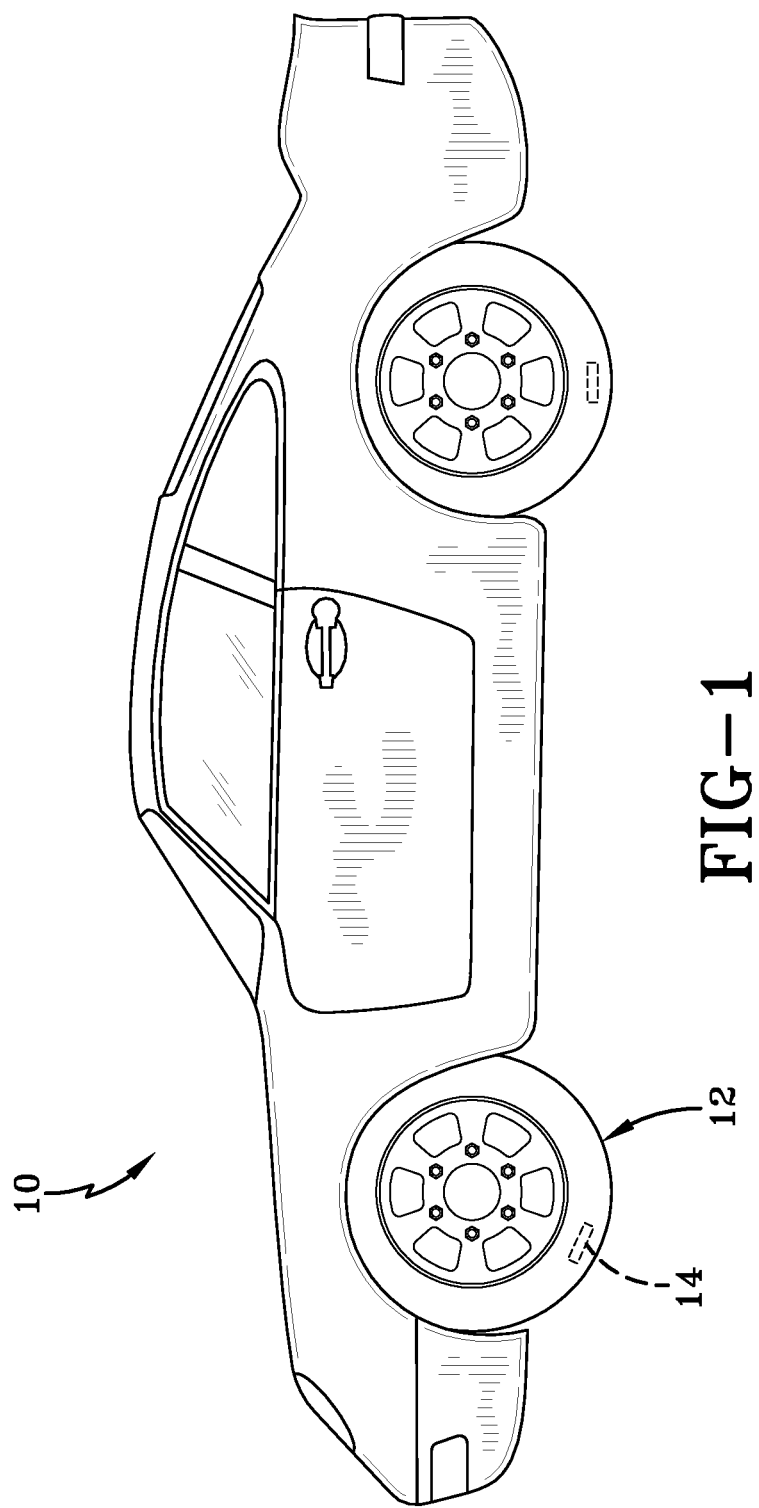
FIG. 1 is a diagrammatic view of a vehicle showing tire-mounted sensors.
Figure 2:
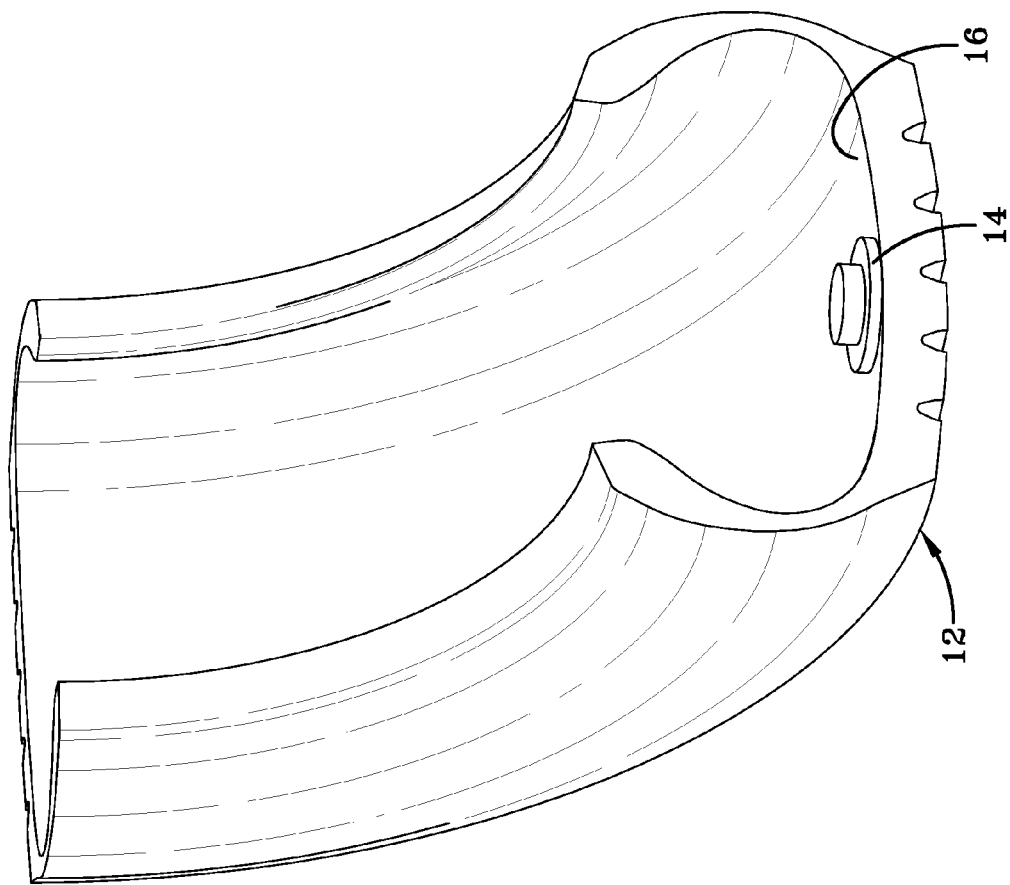
FIG. 2 is an exploded perspective view of a portion a tire to which a sensor package mounts.

Referring to FIGS. 1 and 2, a vehicle 10 is shown supported by multiple tires 12, each tire equipped with a sensor package 14. While the vehicle 10 is in the general form of a passenger automobile, the subject system can be used in any vehicle system. The sensor module 14 is of a type commercially available, suitable for mounting to an inner liner 16 of the vehicle 10. The sensor module or package 10 includes a pressure sensor and a temperature sensor for respectively measuring the air pressure and temperature of the tire inner cavity during tire operation. In addition, the sensor module 10 pursuant to the invention includes a vibration sensor mounted for measuring tire deformation during tire operation. The vibration sensor is preferably piezo-based and generates a signal indicative of tire deformation. From the signal, the footprint of the tire 12 as it rotates against a ground surface may be roughly estimated (also referred to herein as a "raw" or "unfiltered" estimation) ascertained by means of the methodology taught in co-pending U.S. patent application Ser. No. 13/534,043, filed Jun. 27, 2012 entitled: "Load Estimation System and Method for a Vehicle Tire" and hereby incorporated by reference in its entirety.

The piezo-sensor within module 14 generates a signal indicative of tire deformation within a rolling tire footprint. The piezo-sensor transmits a raw signal to a signal processor (not shown). The peak to peak length of the signal is analyzed to ascertain the length of the tire footprint. Appropriate tables are then consulted which provide tire-specific loading information for the tire based on the piezo-sensor measured footprint length, tire air pressure, and tire cavity temperature data.

The estimation of tire loading pursuant to the above-identified application may utilize a filtering model such as a Kalman filter. Determining tire loading from measurement of tire deflection, however, is problematic because of the presence of a "noise" contribution to tire deformation. As used herein, "noise" refers to external influences on a tire, other than tire loading, which affect tire deformation and thereby render load estimates based on measurement of such tire deformation inaccurate. For example, road roughness affects tire deformation, the greater the roughness of the road surface on which the tire is riding, the greater the potential for noise distortion in any static tire load estimate based on tire deformation. The subject invention proposes to minimize the effect of noise contribution in the form of road roughness on tire load estimation through the implementation of an adaptive filter which takes into account road surface roughness in the load estimation procedure.

The use of an algorithm is proposed that utilizes a tire mounted sensor, preferably a piezo-sensor, to estimate both tire load and road roughness. The algorithm adapts to the effect of road roughness variation for the purpose of load estimation, an important aspect in real-world driving conditions. The system and method disclosed herein uses a piezo-energy harvester signal for both tire load and road roughness estimation. The aforementioned objective of minimizing "noise" effect on load estimation is achieved by using an adaptive Kalman filter as will be explained. The information of the global load and of the load distribution can subsequently be profitably used by advanced brake control systems like the electronic brake distribution (EBD) system to optimize the system performance and reduce vehicle stopping distance. In the case of a commercial vehicle application, the weight estimated on each wheel can be averaged to produce an estimate of the vehicle weight. The vehicle weight may then be broadcast to a central location, hence eliminating the need for weigh stations.

The algorithm used in the subject system uses the piezo-harvester signal for both load and road roughness estimation rather than relying on either an accelerometer or a strain sensor. The algorithm disclosed herein takes into account road roughness during load estimation and, as such, more closely reflects real-world driving conditions. And, since the Kalman filter based approach of the subject algorithm is a recursive procedure, there is no need for historical information to be stored, unlike a moving average method of analysis.

A conventional Kalman filter is relatively sensitive to the selection of dynamic model noise level. As such the conventional filter is vulnerable to inaccuracies due to road roughness variation. The subject approach, to the contrary, in using an adaptive Kalman filtering algorithm is more robust and adaptive to sudden changes in road roughness condition.

Figure 25:
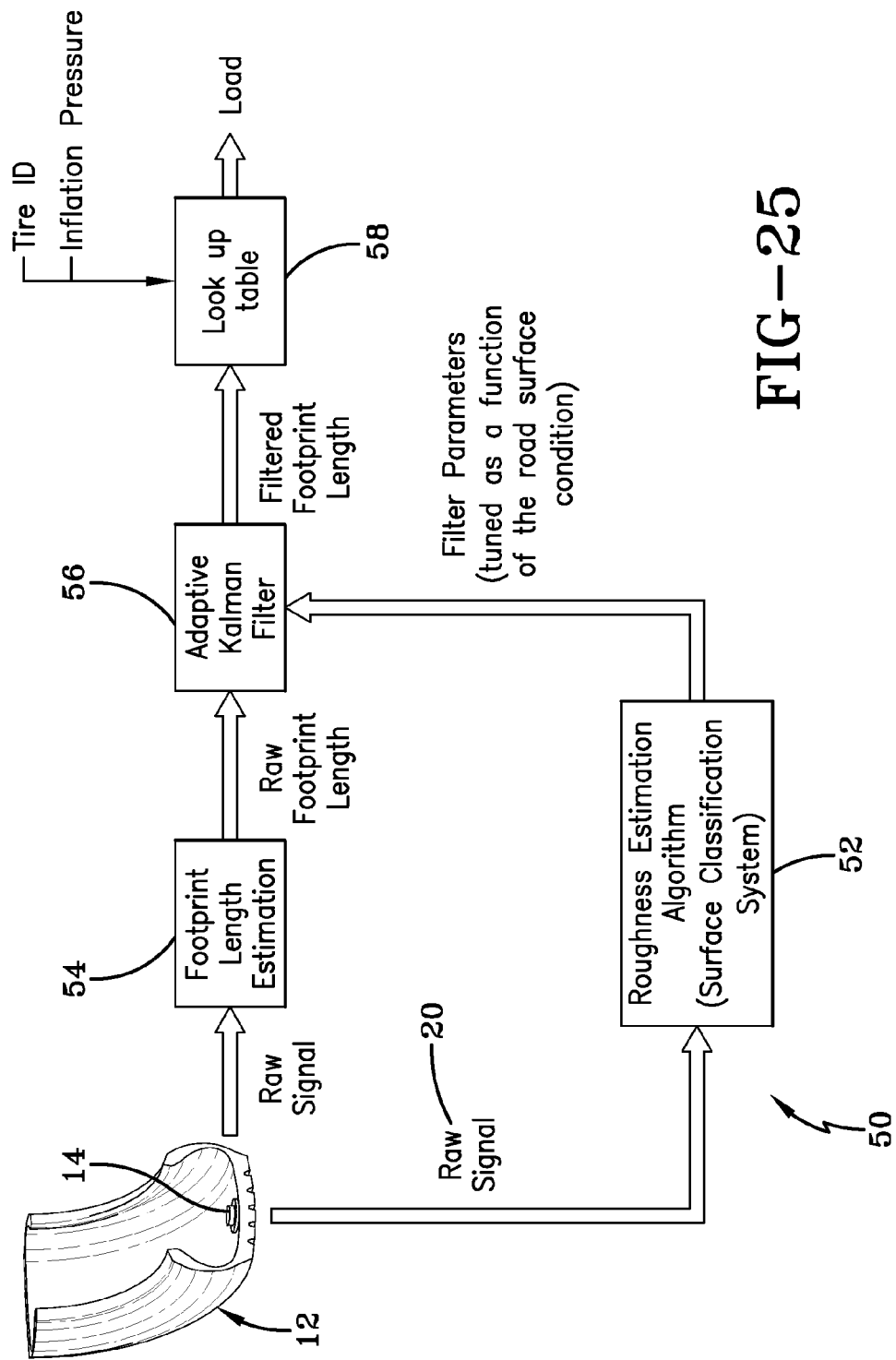
FIG. 25 is a data flow diagram of the subject load estimation algorithm.

The subject load estimation algorithm is diagrammed in FIG. 25. A shown therein, the tire 12 is equipped with a tire attached sensor module 14, generally including temperature and pressure measuring sensors (TPMS) plus a piezo-sensor for generating a signal indicative of tire deformation within a rolling tire footprint. The module 14 is attached to the inner liner of the tire within the tire crown region by suitable means such as an adhesive. From the module 14, a raw energy harvester signal is produced that is indicative of tire deformation within a rolling tire footprint. The tire deformation is proportional to the load supported by the tire. The raw signal is used in a footprint length estimation 54 procedure of the type disclosed by co-pending U.S. application Ser. No. 13/534,043 incorporated herein.

The raw signal from the piezo-sensor in module 14 is processed at footprint length estimation 54 to yield a raw footprint length. Because the raw footprint length estimation is vulnerable to error from road roughness, the raw footprint length is further filtered by an Adaptive Kalman Filter 56. The raw signal from piezo-sensor of module 14, in addition to being used in an initial raw footprint length estimation 54, is also used in a roughness estimation algorithm 52 shown. The Roughness Estimation Algorithm 52 operates on a Surface Classification System as will be explained. The Adaptive Kalman Filter 56 uses Filter parameters which are tuned as a function of the road surface condition by Roughnesss Estimation Algorithm 52. Consequently, a Filtered Footprint Length is obtained from the Adaptive Kalman Filter. The Filtered Footprint Length more accurately estimates the tire footprint length after compensating for road roughness.

A tire-specific look-up table 58 is empirically created which provides tire loading based on inputs of Footprint Length, Tire Identification, and Tire Inflation Pressure. The tire pressure is obtained from the TPMS module 14 along with Tire Identification. Combined with the Filtered Footprint Length from Adaptive Kalman Filter 56, the loading for a particular tire at measured inflation pressure and footprint length may be obtained.

Figure 3:
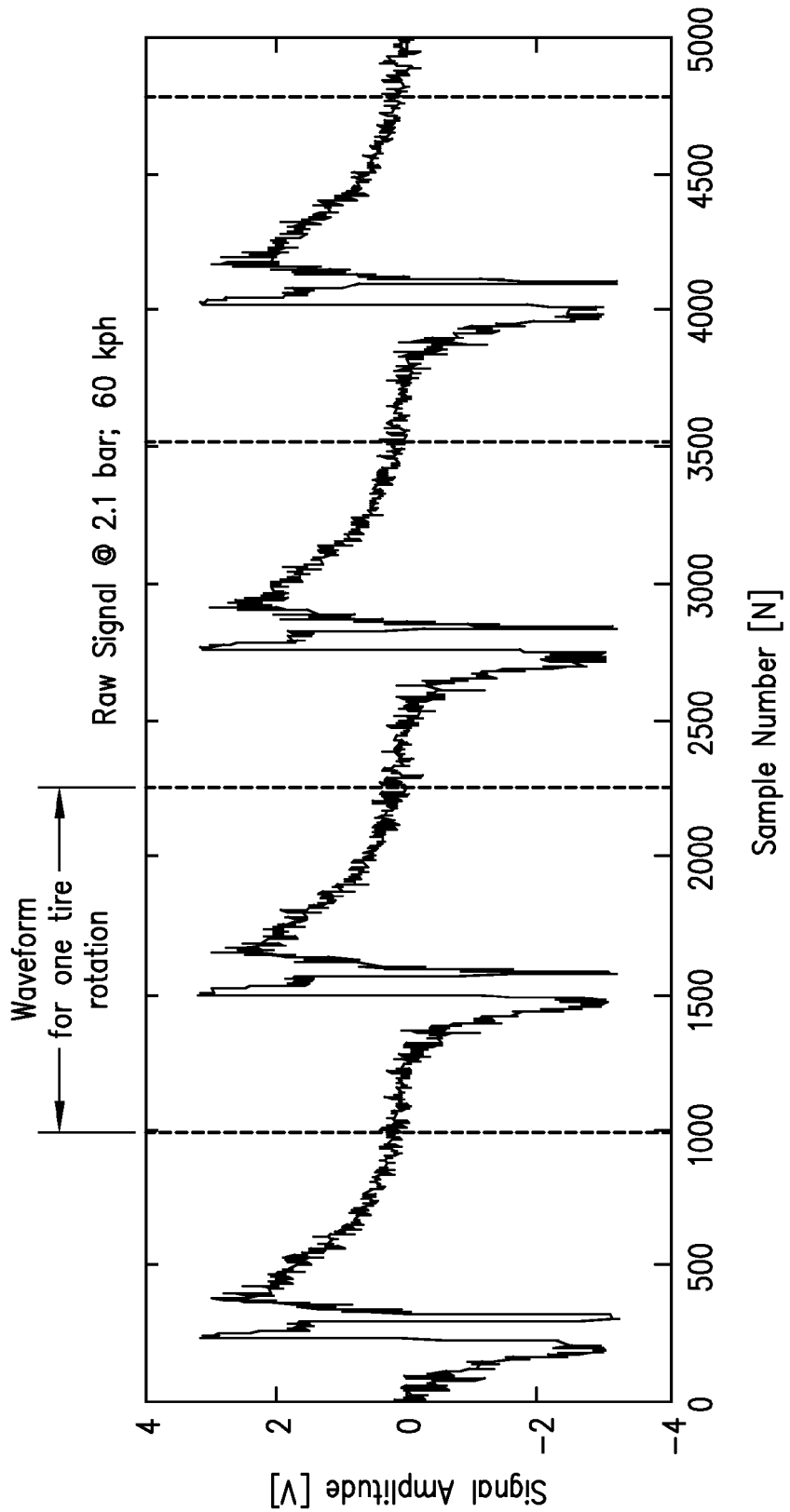
FIG. 3 is a graph showing a characteristic waveform for one tire revolution.
Figure 4:
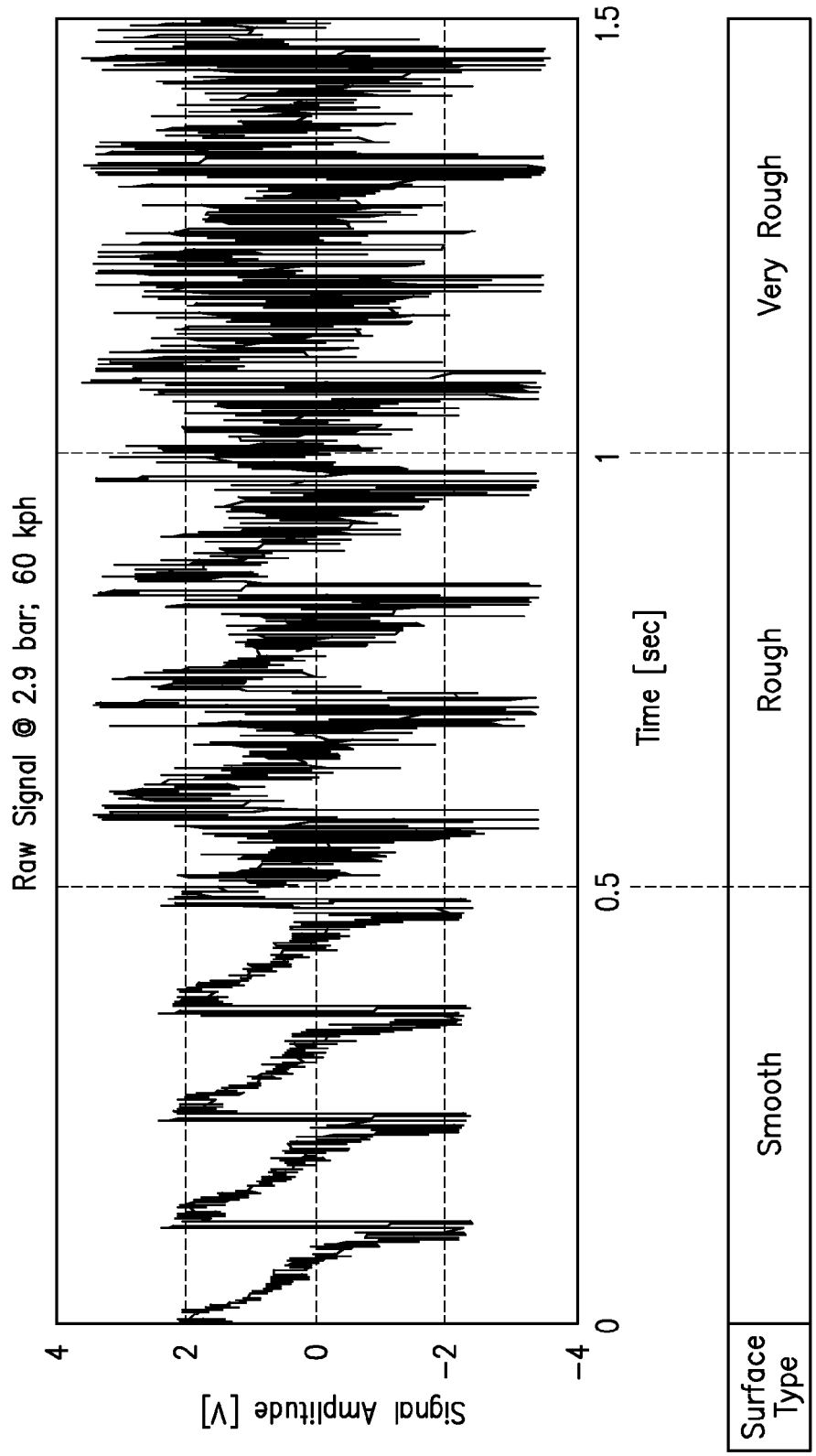
FIG. 4 is a graph showing raw signal amplitude vs. surface roughness.

Referring to FIG. 3, a raw signal waveform is shown. The waveform from one tire rotation is indicated. The waveform shown is experimentally derived from a tire at 2.1 bar; and travelling at 60 kph. The graph from FIG. 3 shows signal amplitude [V] vs. Sample Number. In FIG. 4, a raw signal from a tire at 2.9, 60 kph is shown graphically under three road conditions: smooth surface; rough surface; and very rough surface. It will be appreciated that the signal amplitude (from which a tire load will be estimated) fluctuates significantly from surface to surface condition. The present invention acts to characterize the roughness level of a surface in order to compensate for the effect that surface roughness "noise" presents in a raw tire deformation signal.

Figure 5:
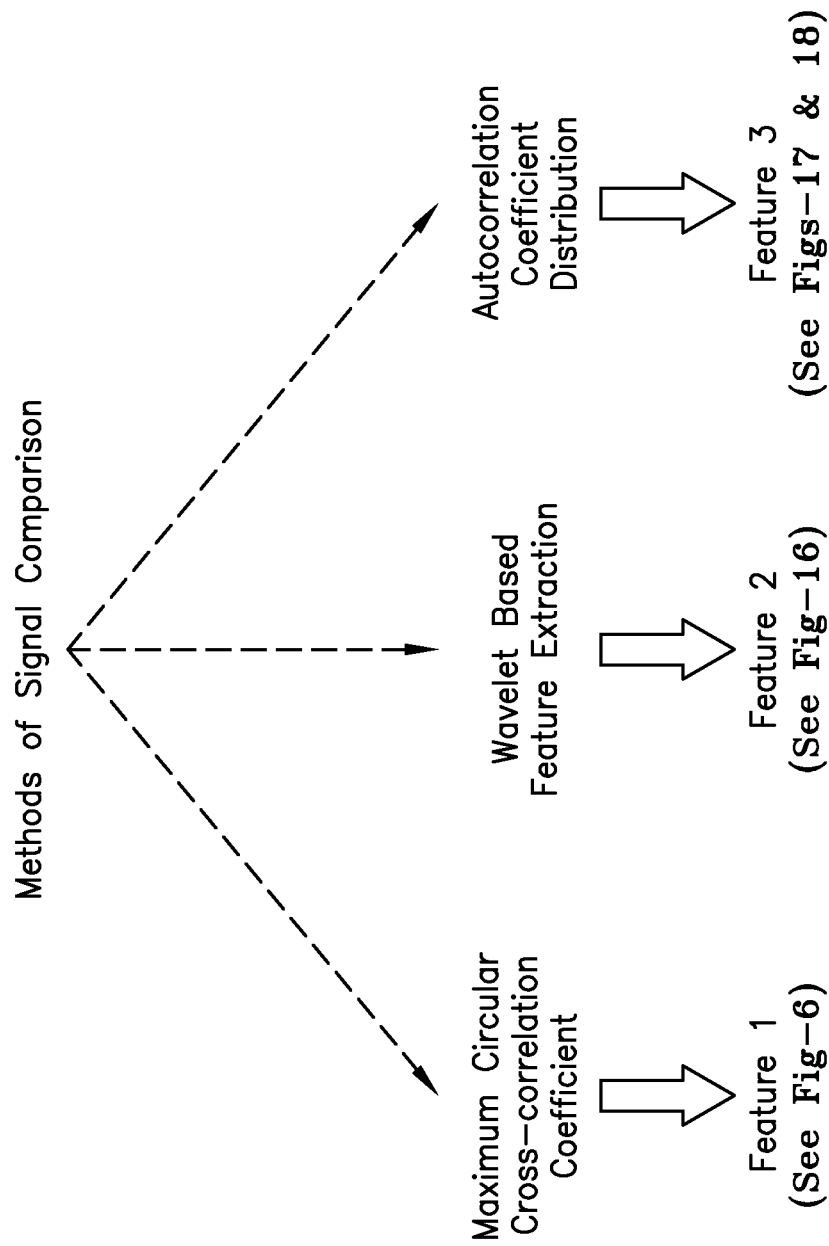
FIG. 5 is a diagram showing methods of signal comparison for use in a signal comparison algorithm.
Figure 6A:
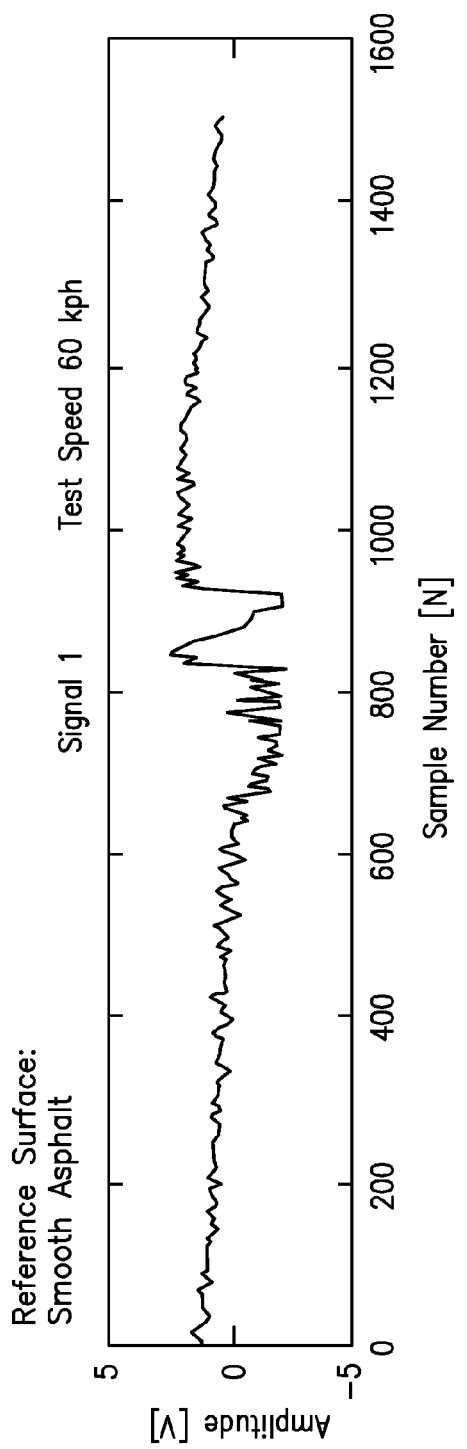
FIG. 6A is a graph showing reference signal data for one tire rotation under smooth asphalt conditions at 60 kph.
Figure 6B:
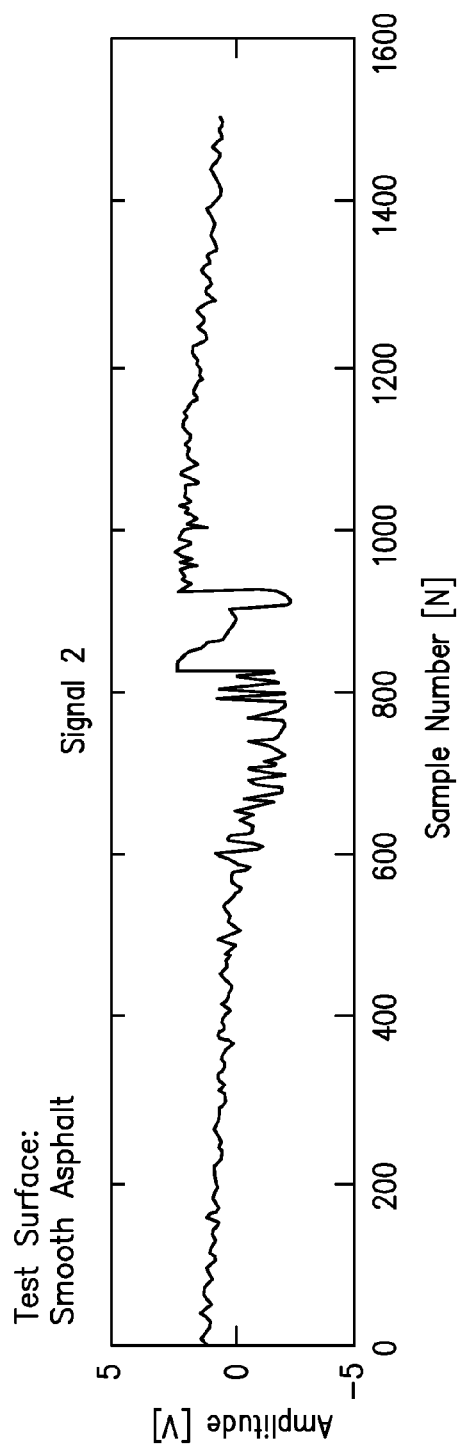
FIG. 6B is a graph showing test data for one tire rotation under smooth asphalt conditions at 60 kph.
Figure 6C:
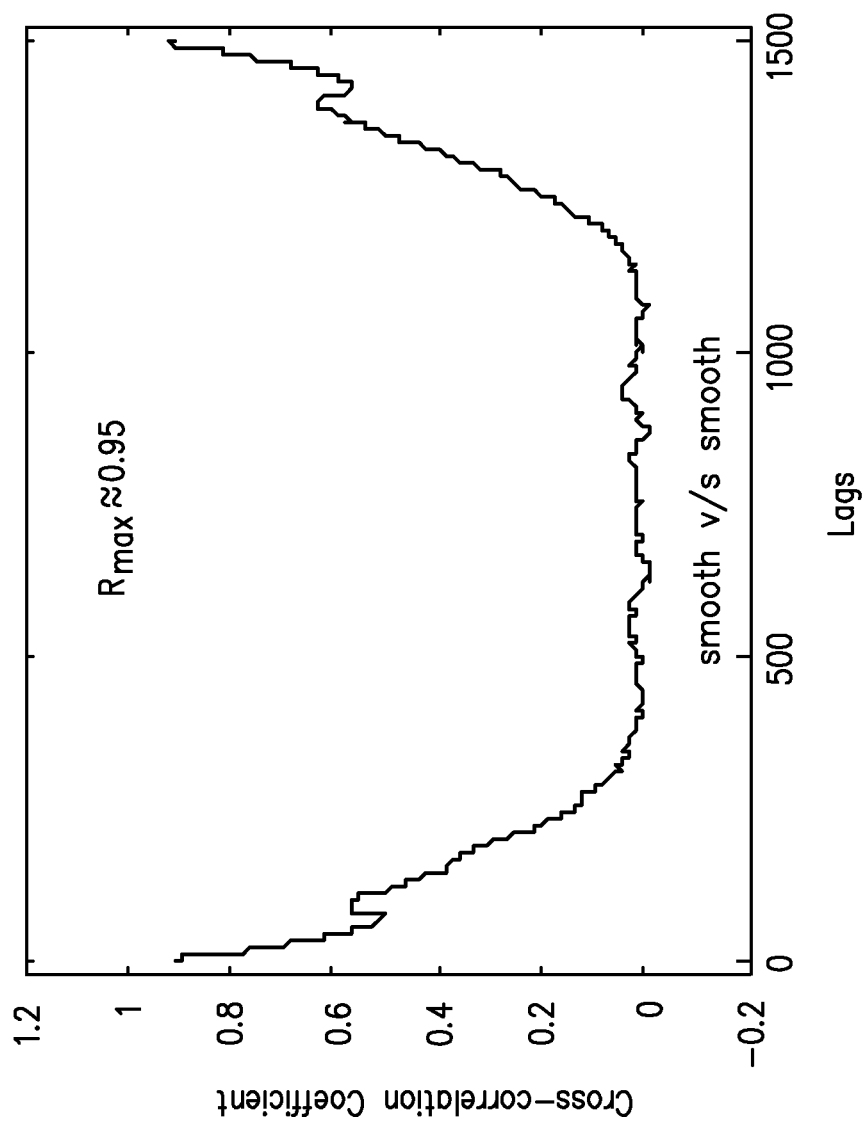
FIG. 6C is a graph showing the cross-correlation coefficient (R) for a smooth vs. smooth classification case, $R_{max}$ approximately equal 0.85.

A signal comparison algorithm may be constructed, as seen from FIG. 5, using three distinct methods of signal comparison: a maximum circular cross-correlation coefficient (See FIG. 6); a wavelet based feature extraction (See FIG. 16); and an autocorrelation coefficient distribution (See FIGS. 17 and 18). The three methodologies extract different features from the signal comparison based upon the methodology employed. In FIGS. 6A through 6C, the maximum circular cross-correlation coefficient methodology is demonstrated in graphical form. FIG. 6A shows a Case 1 test in which a smooth asphalt reference surface is grafted for one tire rotation at 60 kph. FIG. 6B shows a graph for Case 1 for a test surface, also configured as smooth asphalt. In this smooth vs. smooth test, a Cross-correlation Coefficient is examined as a basis for classification. The Cross-correlation Coefficient R is defined as a measure of similarity of two waveforms as a function of a time-lag applied to one of them. For the smooth vs. smooth (FIGS. 6A and 6B) Case 1 test, an $R_{max}$ of approximately 0.95 was empirically determined and is shown graphically in FIG. 6C. Stated descriptively, a tire undergoing deformation on a smooth surface would be expected to experience a radius deviation from the smooth surface no greater than 0.05.

Figure 7C:
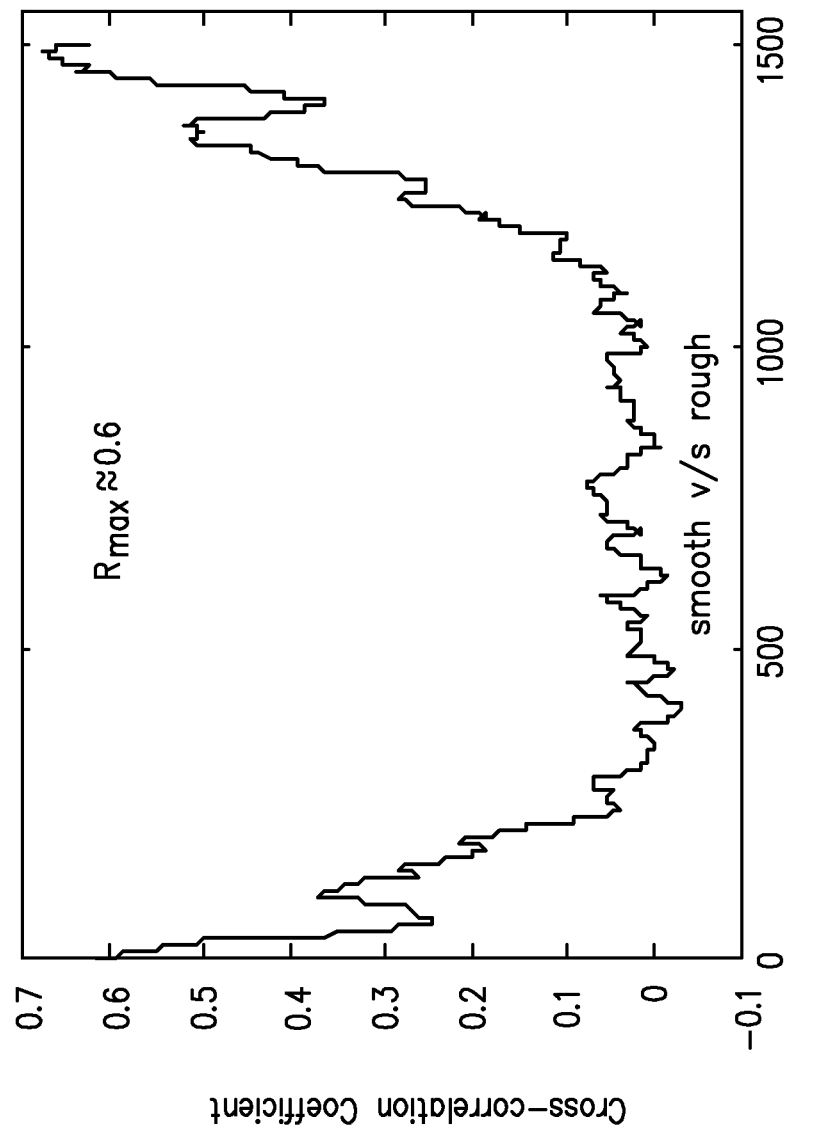
FIG. 7C is a graph the cross-correlation coefficient (R) for a showing smooth vs. rough classification case, $R_{max}$ approximately equal 0.6.

FIGS. 7A and 7B show graphs for a Case 2 test in which a reference smooth surface is compared against a test surface of rough asphalt. A comparison of the two graphs results in an maximum Circular Cross-Correlation Coefficient $R_{max}$ for the Case 2 test of approximately 0.6, indicated graphically in FIG. 7C. Thus, a rough asphalt surface will cause a circular tire deformation greater than that caused by a smooth, FIGS. 6A, 6B, surface.

Figure 8C:
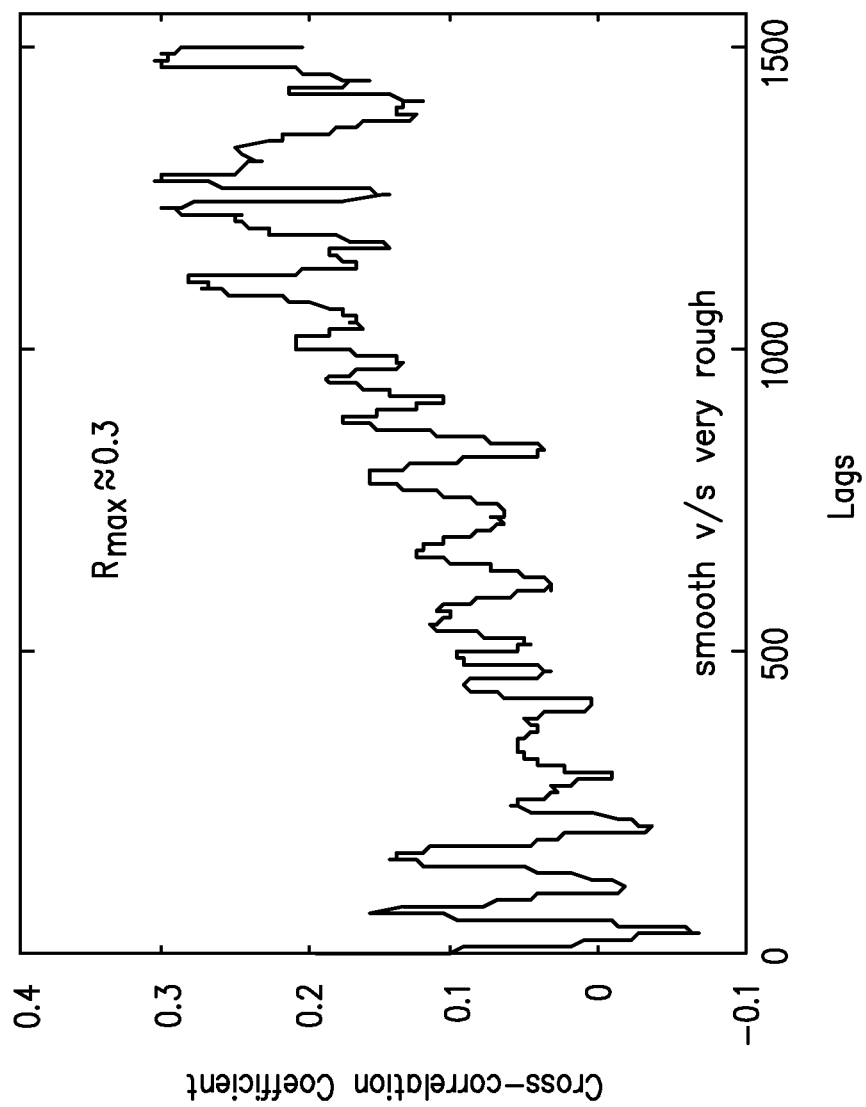
FIG. 8C is a graph showing the cross-correlation coefficient (R) for a smooth vs. very rough case, $R_{max}$ approx. equal 0.3.

In FIGS. 8A and 8B, a Case 3 test parameter is used comparing a smooth reference surface graph of FIG. 8A with a very rough asphalt test surface shown graphically in FIG. 8B. The resultant maximum Circular Cross-correlation Coefficient $R_{max}$ for Case 3 is determined as approximately 0.3, shown graphically in FIG. 8C.

Figure 9C:
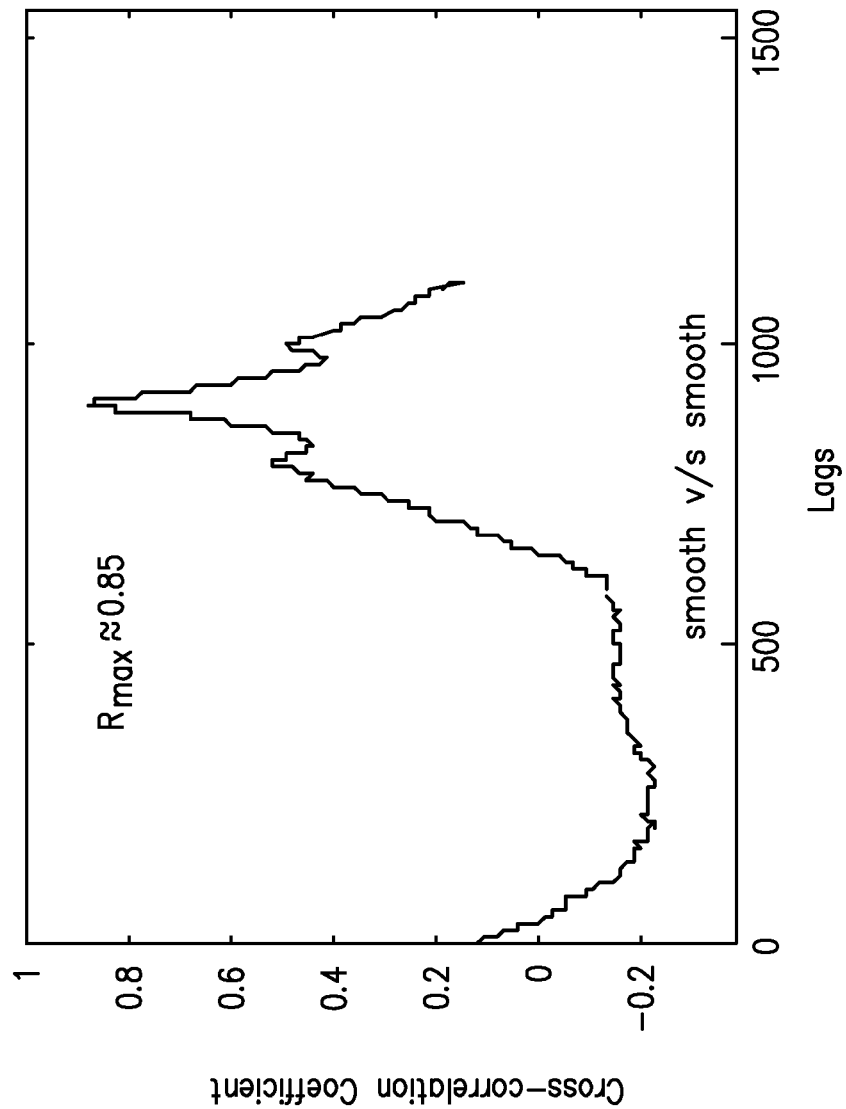
FIG. 9C is a graph showing the cross-correlation coefficient (R) for a smooth vs. smooth classification case, $R_{max}$ approximately equal 0.85.
Figure 10C:
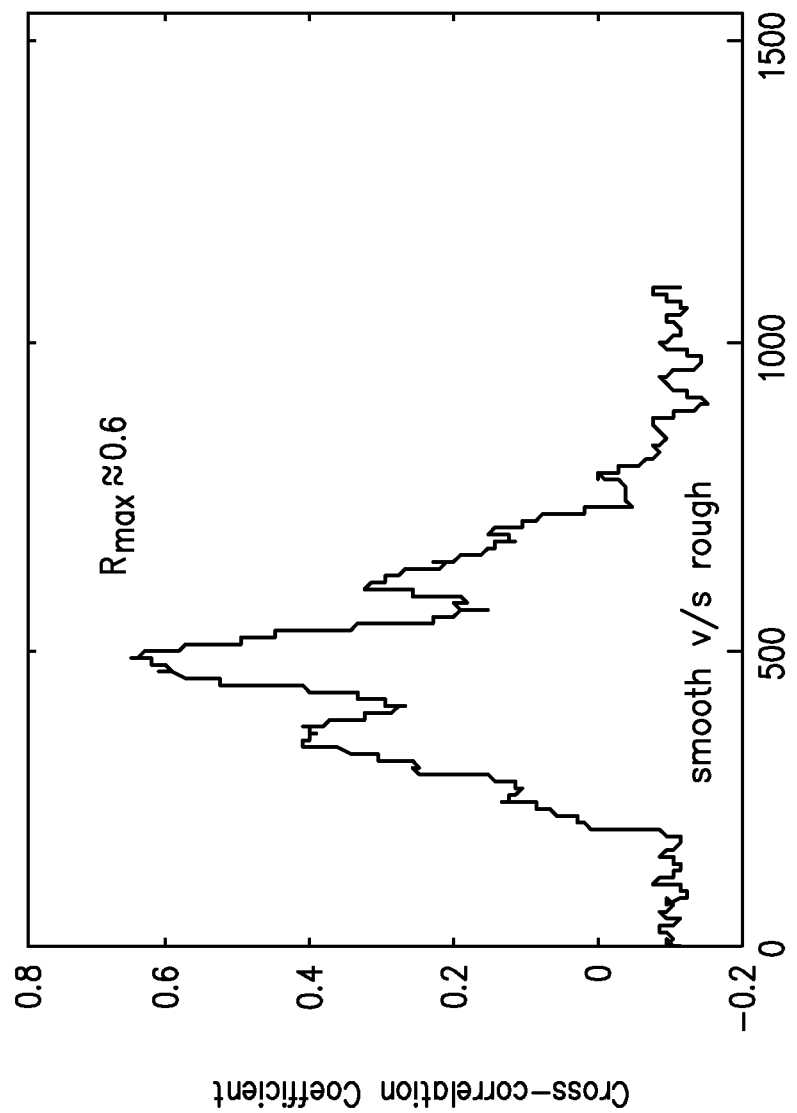
FIG. 10C is a graph showing the cross-correlation coefficient (R) for a smooth vs. rough classification case, $R_{max}$ approximately equal 0.6.
Figure 11A:
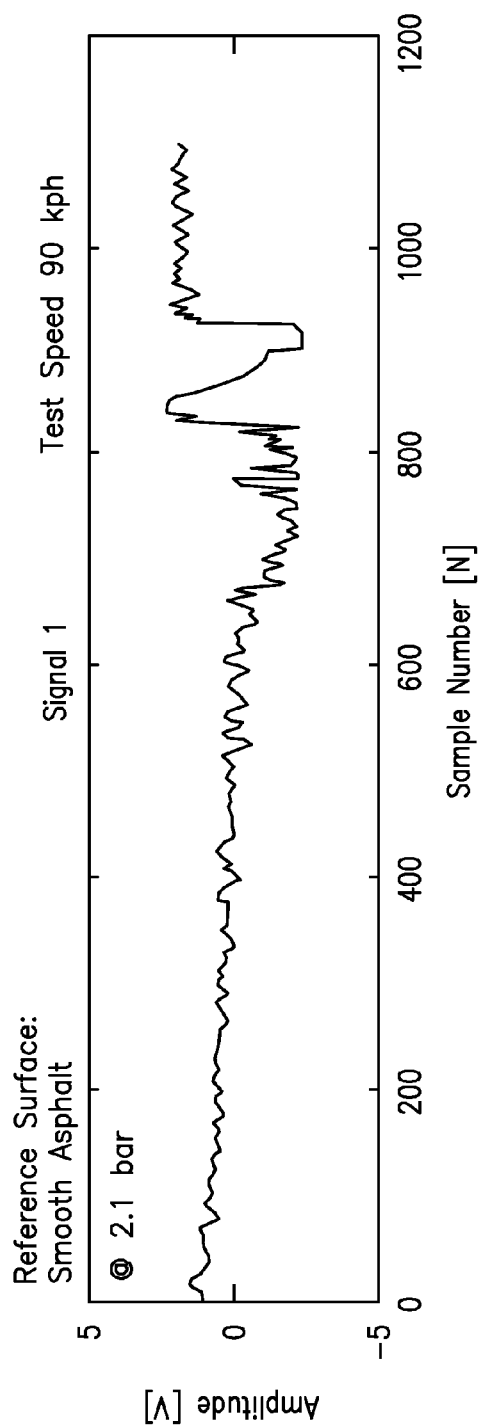
FIG. 11A is a graph showing reference signal data for one tire rotation under smooth asphalt conditions at 90 kph.
Figure 11B:
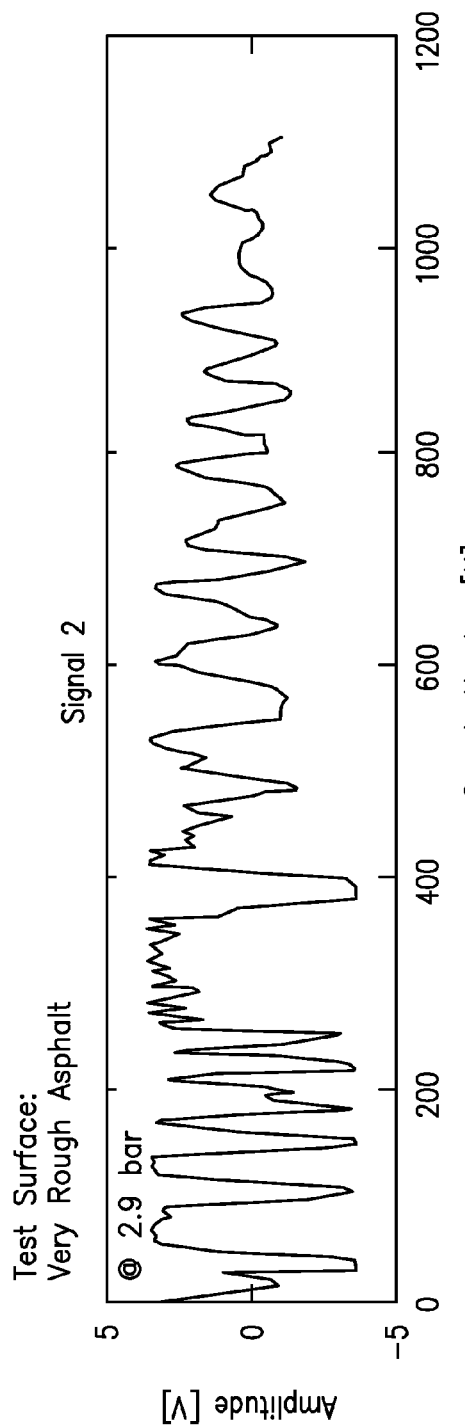
FIG. 11B is a graph showing test signal data for one tire rotation under very rough asphalt conditions at 90 kph.
Figure 11C:
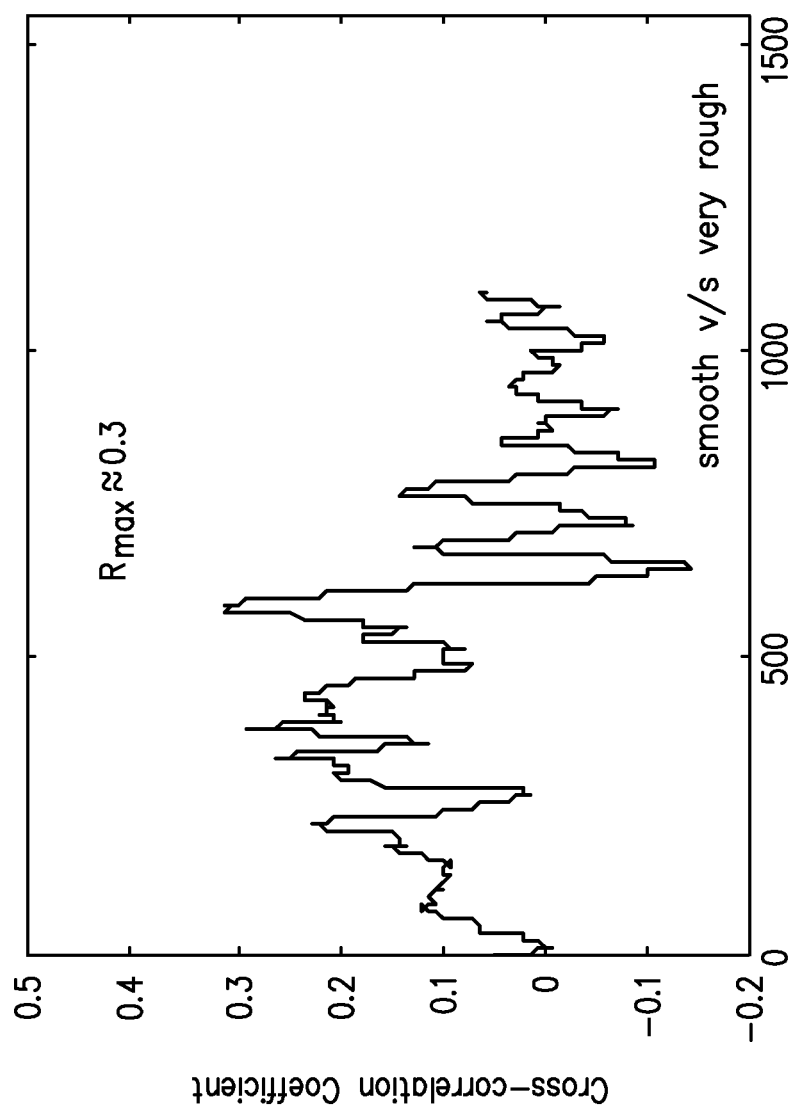
FIG. 11C is a graph showing the cross-correlation coefficient (R) for a smooth vs. very rough classification case, $R_{max}$ approximately equal 0.3.
Figure 12A:
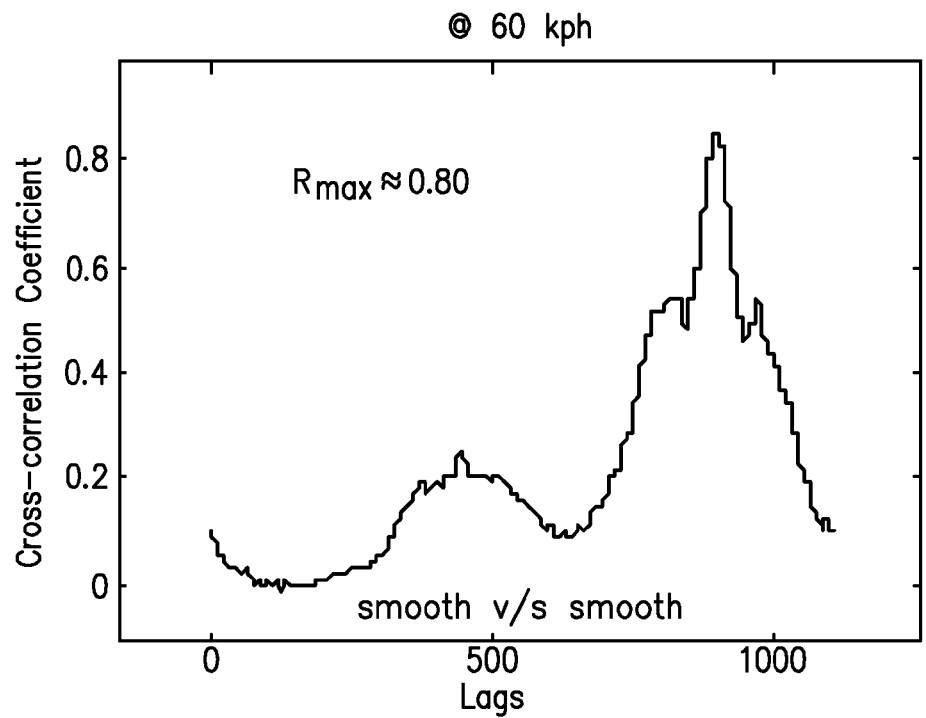
FIGS. 12A, 12B, 13A, 13B, 14A and 14B are summary graphs of the speed dependence study shown Cross-correlation coefficient graphs at speeds of 60 and 90 kph and for the three conditions of smooth vs. smooth, smooth vs. rough, and smooth vs. very rough. The $R_{max}$ for each is indicated in each graph.
Figure 12B:
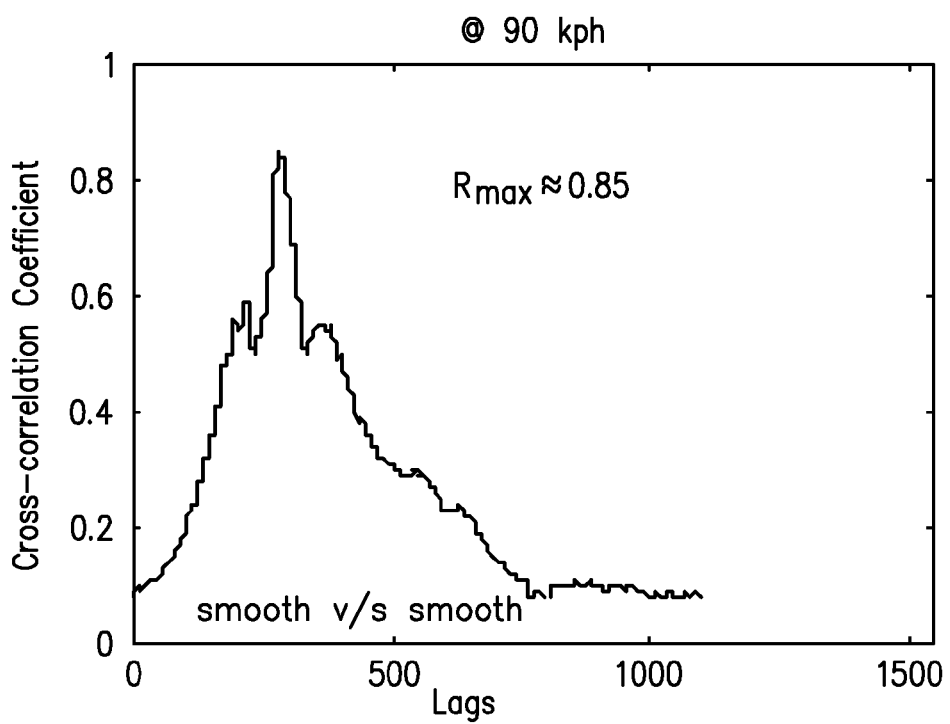
Figure 13A:
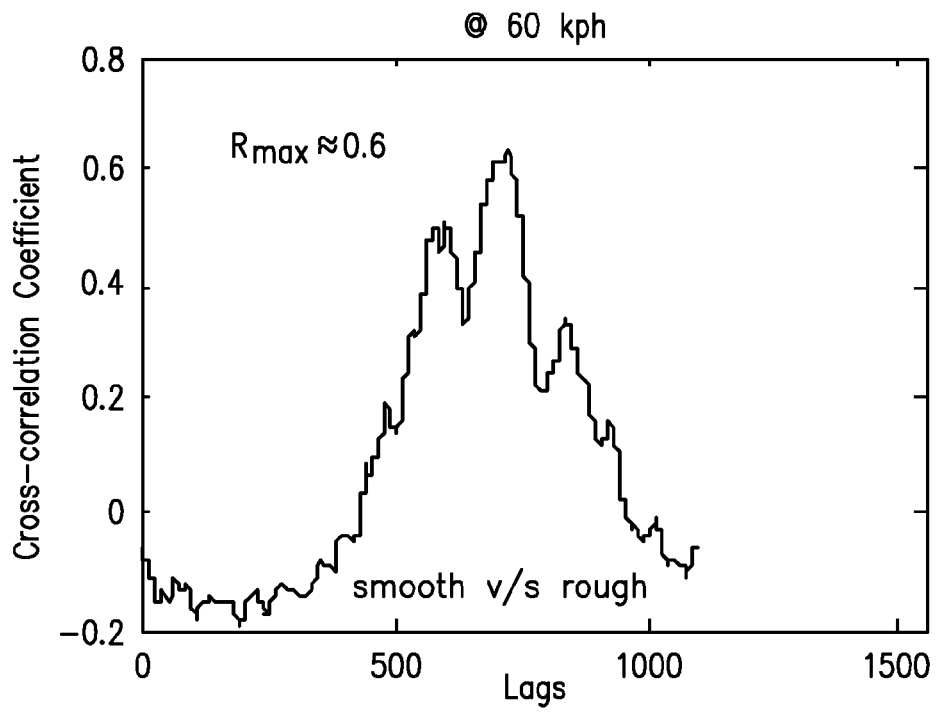
Figure 13B:
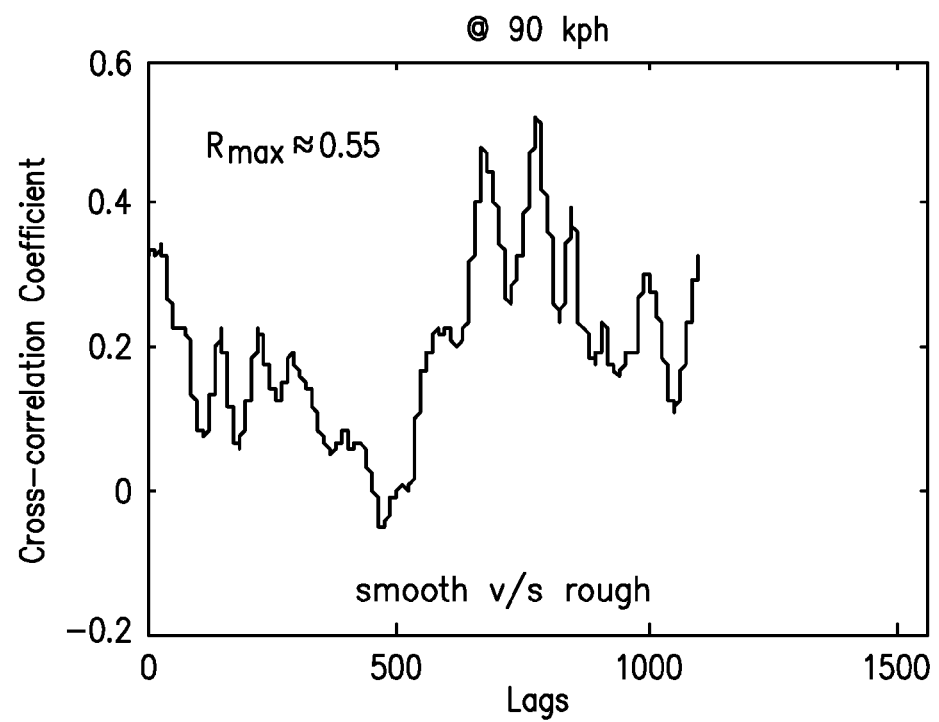
Figure 14A:
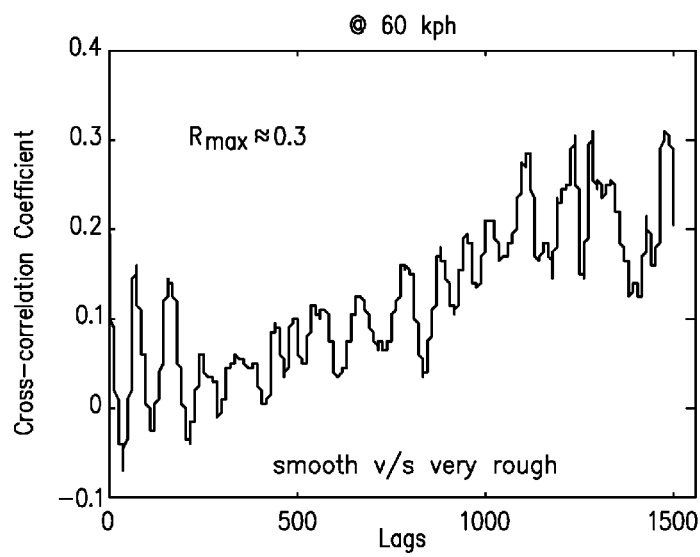
Figure 14B:
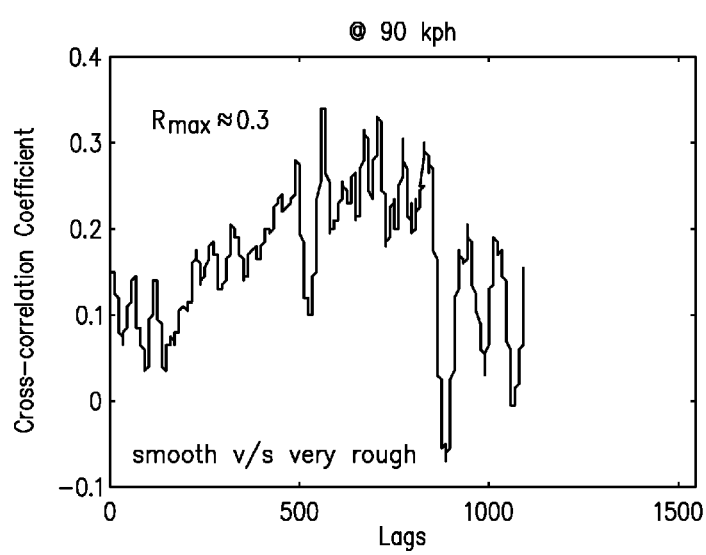
Figure 15:
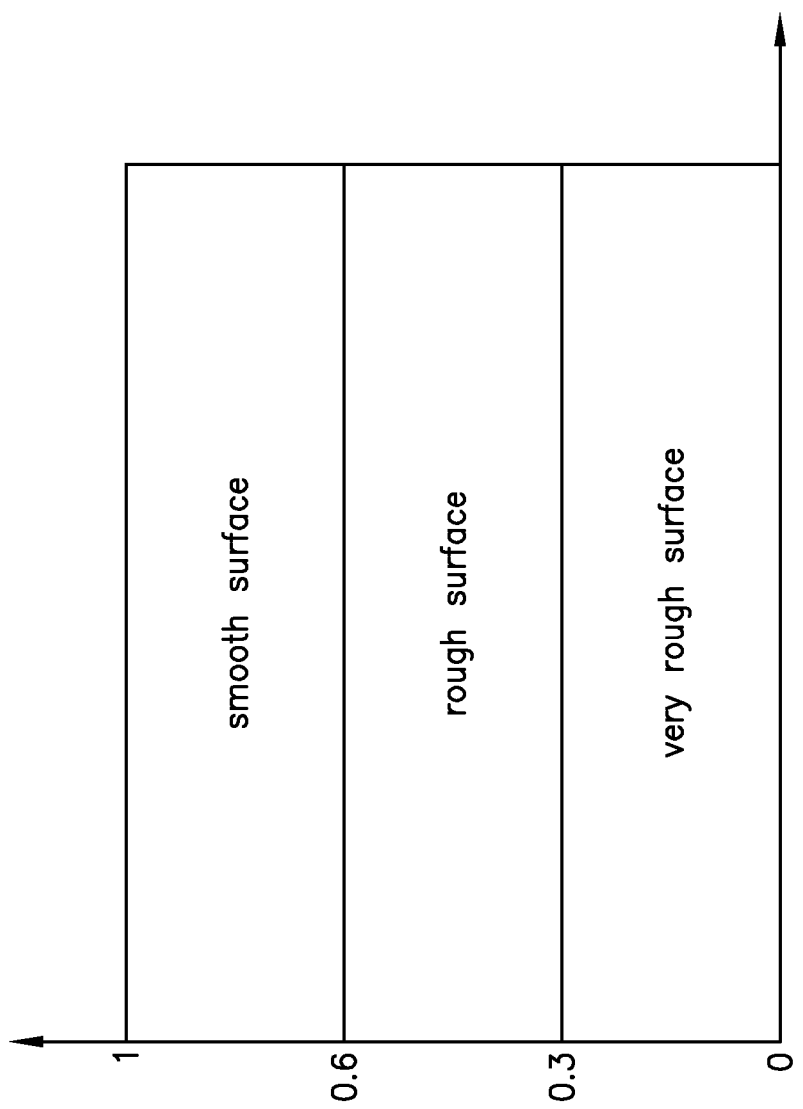
FIG. 15 is a diagram illustrating Classification Rules for the Circular Cross-correlation Coefficient.

FIGS. 9A, 9B, 9C (Case 1), FIGS. 10A, 10B, 10C (Case 2), and FIGS. 11A, 11B, 11C (Case 3) are graphs similar to the test graphs of FIGS. 6A through C, 7A through 7C, and 8A through 8C but conducted at a high speed of 90 kph. The Cross-correlation Coefficient graphs of FIGS. 9C, 10C and 11C generally correspond with the slow speed graphs of FIGS. 6C, 7C and 8C, demonstrating that the $R_{max}$ values under each road surface condition is unchanged over a range of vehicle speeds. A comparative summary of the speed dependence study is graphed in FIGS. 12A, 12B (smooth vs. smooth); FIGS. 13A, 13B (smooth vs. rough); and FIGS. 14A, 14B (smooth vs. very rough). The comparative $R_{max}$ values at the two speeds validates the use of $R_{max}$ as a basis for categorizing road surfaces for the purpose of filtering load estimation measurements. FIG. 15 shows the $R_{max}$ (Maximum Circular Cross-correlation Coefficient) ranges for each of the three road surface levels, and represents the classification rule(s) that are followed in the algorithm.

Figure 16A:
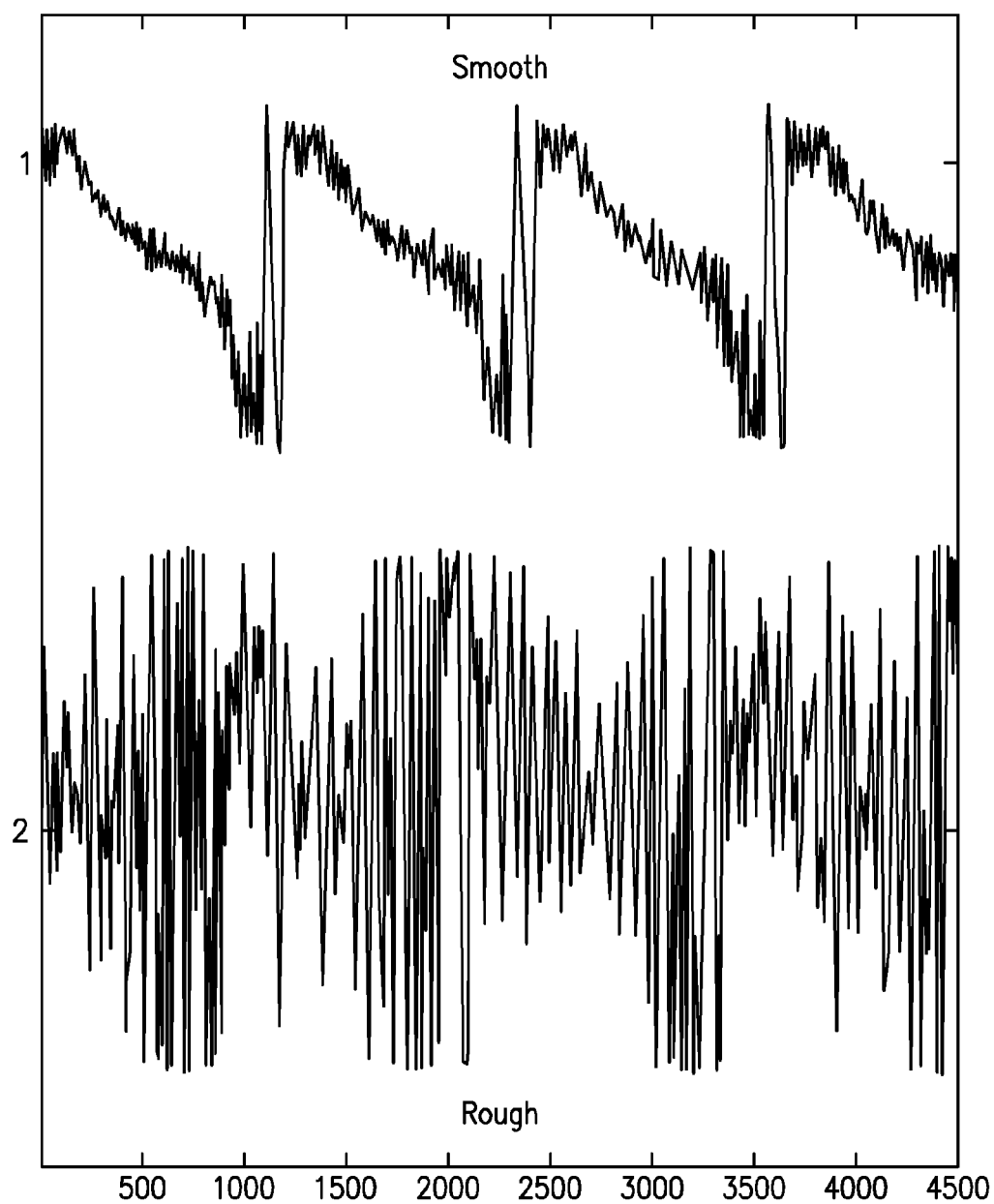
FIG. 16A shows graphs of the raw sensor signal for smooth and rough surface situations.
Figure 16B:
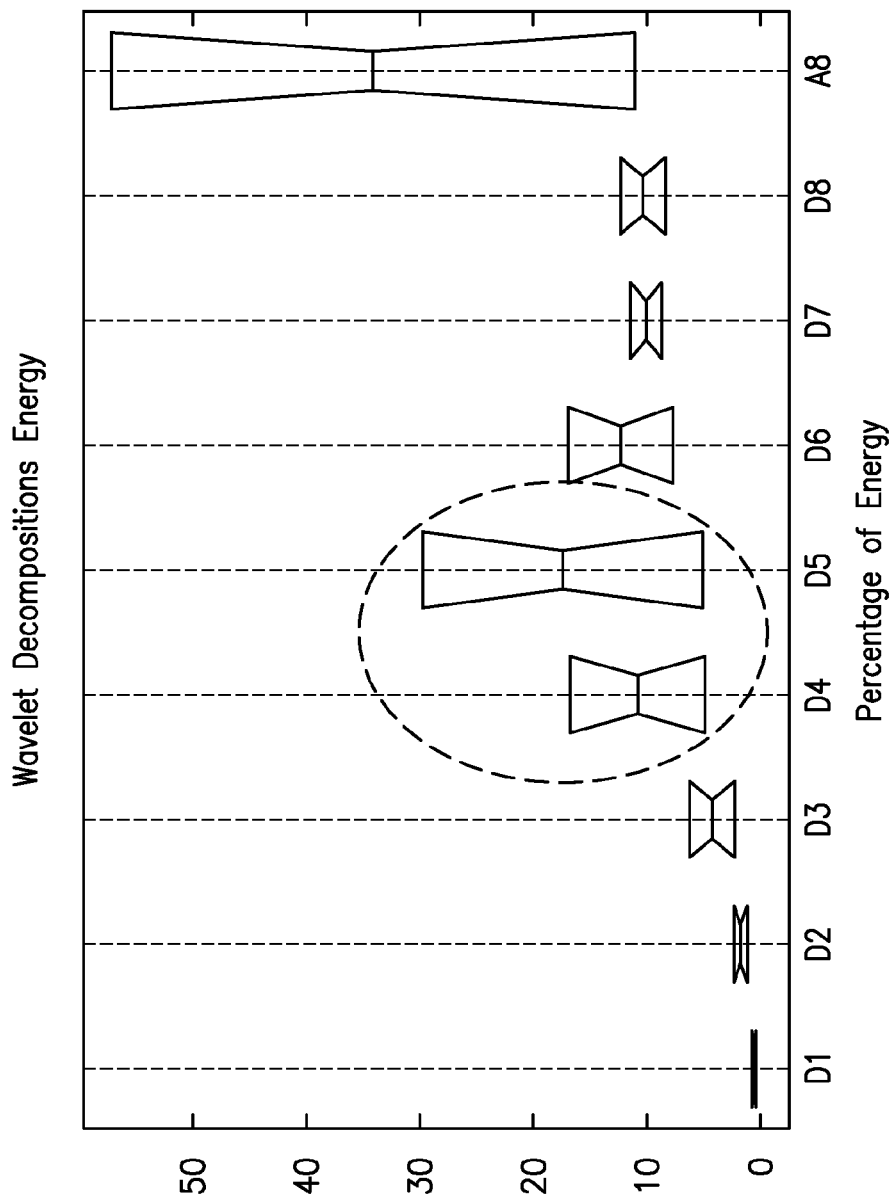
FIG. 16B shows an Energy Distribution graph of Wavelet Decompositions Energy.

FIGS. 16A and 16B show a second approach to constructing a filter that will adapt a load estimation to road surface roughness conditions. A Wavelet Based Feature Extraction Sub-Band Wavelet Entropy methodology is demonstrated graphically for smooth and rough road conditions.

The energy distribution of wavelet decompositions energy is shown in FIG. 16B. Entropy represents the degree of disorder that the filter variable possesses. It will be seen from FIG. 16B that a difference in the sub-band energy distribution exists. A Sub-band wavelet entropy may be defined by the mathematical formulation above in terms of the relative energy of the wavelet coefficients. The relative energy of the wavelet coefficients may then be used in an adaptive filtering of the load estimation in order to compensate for the surface conditions.

Figure 18A:
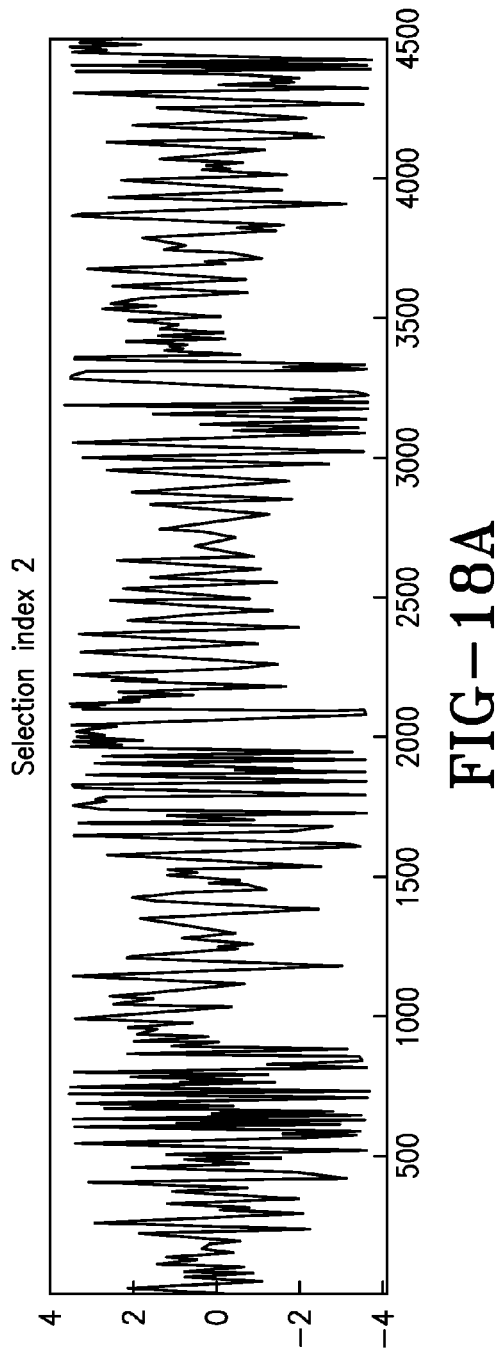
FIG. 18A shows a selection index 2 Visualization of Selected data.
Figure 18B:
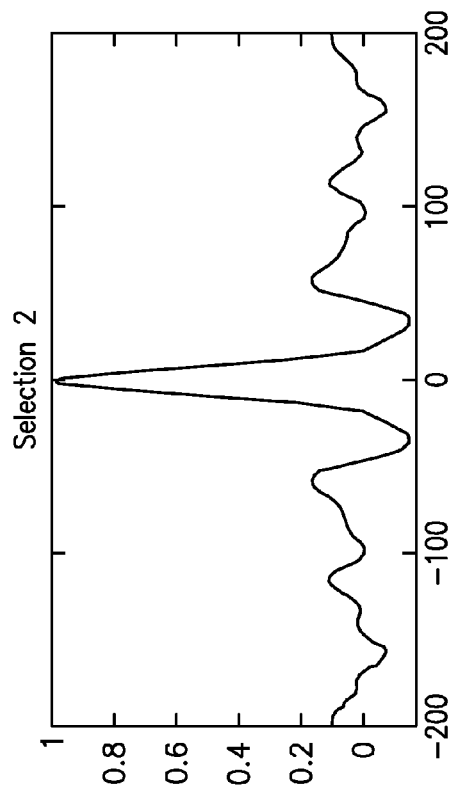
FIG. 18B shows a statistical distribution graph for the data of FIG. 18A

FIGS. 17A, 17B, 18A and 18B illustrate a third alternative feature for filtering estimated load, the use of Autocorrelation Coefficient differentiation. In FIG. 17A, 17B, the distribution of a first selection index 1 and its corresponding statistical graph, respectively, are shown. In FIGS. 18A and 18B, a selection index of 2 is graphed, showing the distribution and statistical graph, respectively. The distribution of the autocorrelation function indicates the surface characteristics of the road surface on which the tire is moving. By discerning the distribution function, an assessment of road roughness may be made. As used herein, "autocorrelation correlation" may be defined as the correlation of a time series with its own past and future values.

Figure 19:
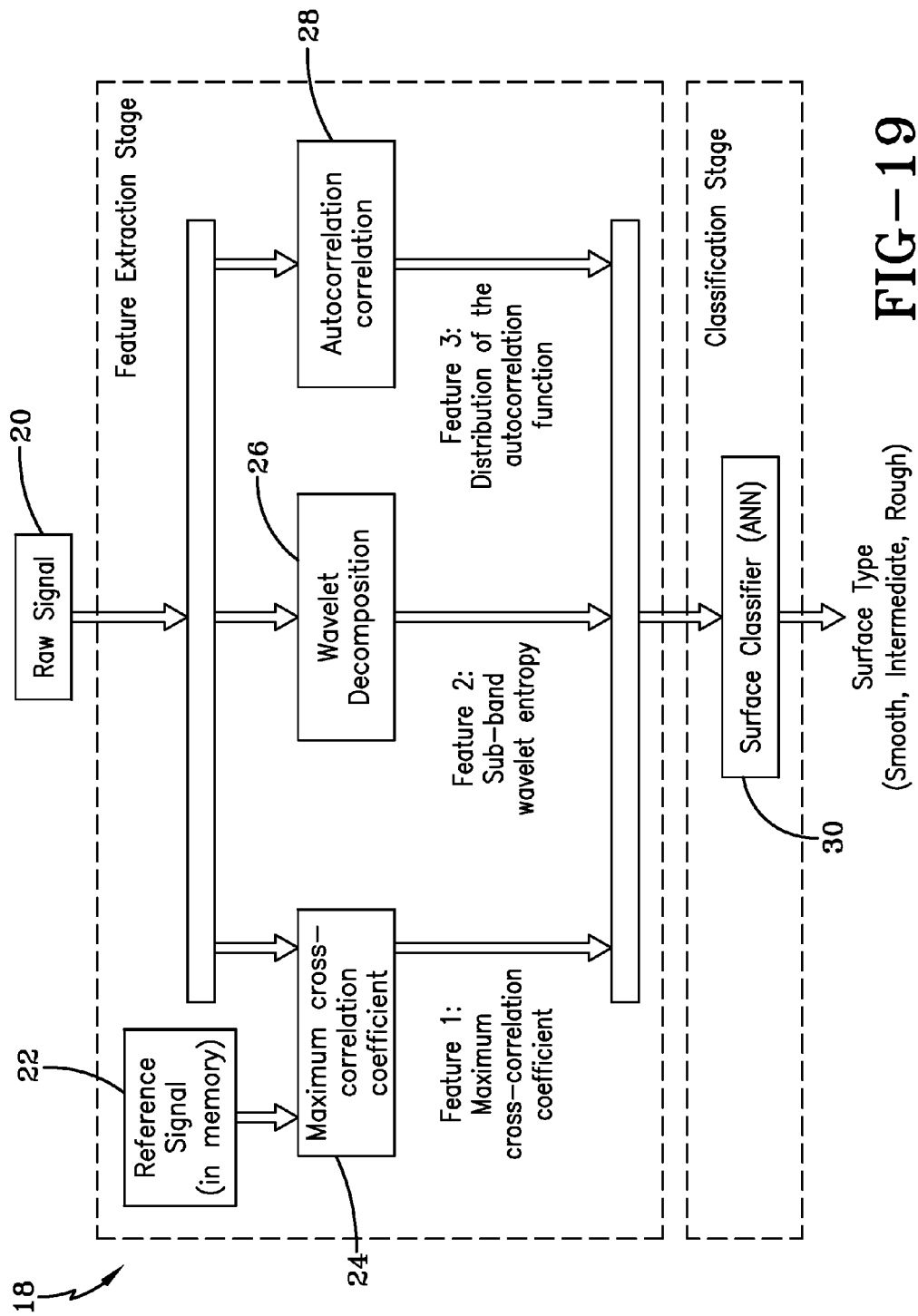
FIG. 19 is a diagram of a Road Surface Classification algorithm.

With reference to FIG. 19, a summary of the three approaches of feature extraction and their respective alternative use in achieving a surface differentiating classification 18 are shown. The raw signal 20 from the tire piezo-sensor may be analyzed using the Maximum cross-correlation coefficient 24 methodology that employs a Reference Signal in processor memory 22. The use of the Maximum cross-correlation coefficient as a surface differentiating feature may be used in a Surface Classifier 30 (ANN) to determine relative surface type (smooth, intermediate, or rough).

Alternatively, the Sub-band wavelet entropy differentiation based on entropy decomposition 26 may be used as a feature methodology. Decomposition of wavelet entropy may used to determine through the use of the Classifier 30 which of the three surface classifications are being encountered by a tire. As a further alternative, the Autocorrelation correlation 28 may be used as a third alternative feature approach. The distribution of the autocorrelation correlation function is evaluated and from the distribution data, a conclusion may be reached through the Surface Classifier 30 as to which of the three surface types are being encountered by the tire during deformation detection.

Figure 20A:
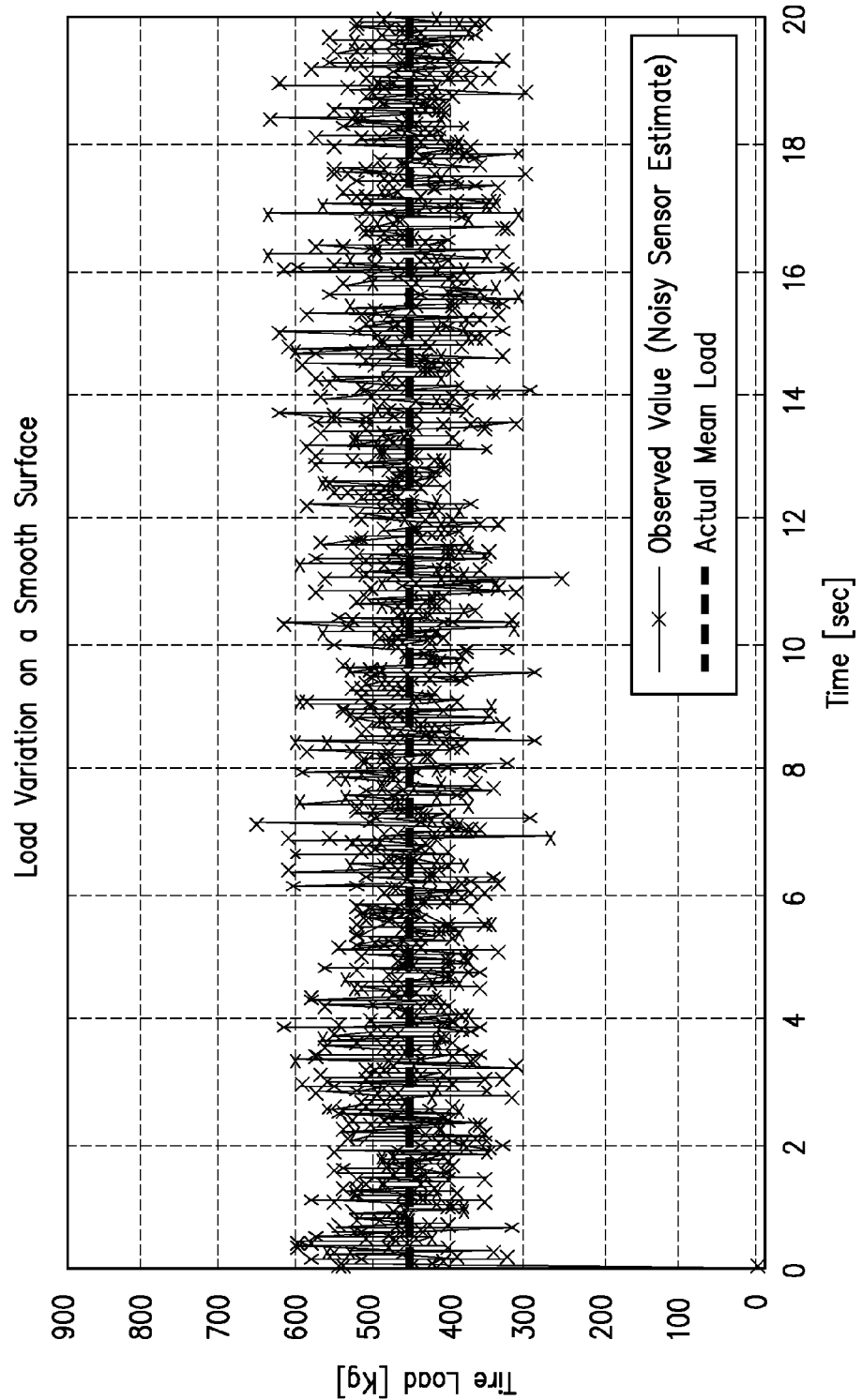
FIG. 20A is a graph showing observed straight-line Noisy Sensor Estimate of load vs. Actual Mean Load.
Figure 20B:
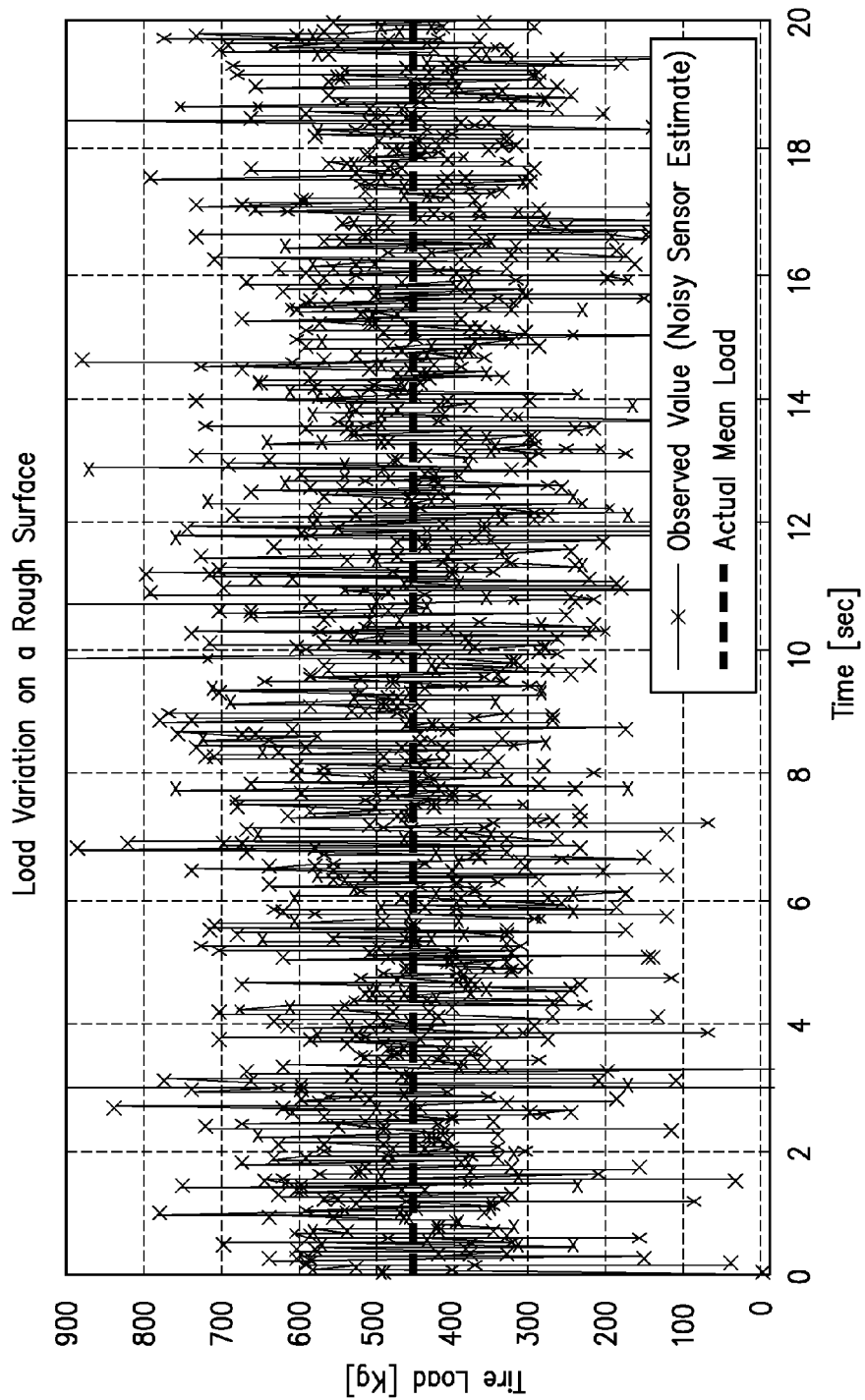
FIG. 20B shows a graph of observed rough surface Noisy Sensor Estimate of load vs. Actual Mean Load.

From FIGS. 20A and 20B load variation under constant speed, straight-line test results, the rationale for interest in road roughness level will be appreciated. FIG. 20A shows a load variation on a smooth surface, both observed value (Noisy Sensor Estimate) and Actual Mean Load. It will be seen that a 15 to 20 percent variation in load estimates can occur even under smooth surface, straight-line driving conditions. From FIG. 20B, it will be seen that a rough surface may cause an even greater variance. A 30 to 40 percent variation is reflected in the rough surface test results of FIG. 20B.

From the above, it is useful to consider road roughness in any estimation of tire load. A Kalman Filter is thus employed. A Kalman Filter, given a noisy discrete-time LTI (define) process and a noisy measurement, can determine an optimal estimate of the state that minimizes the MSE (define) quadratic cost function as set forth below.

$$J = E[(\hat{x}_k - x_k)^T (\hat{x}_k - x_k)]$$

where $(\hat{x}_k - x_k)$ is the state estimation error vector. Here the state of a discrete time-controlled process is governed by the linear stochastic difference equation:

$$x_k = Ax_{k-1} + BU_{k-1} \text{ and } y_k = Cx_k + DU_k$$

The matrix Z relates to the state of the previous time step to the state at the current step, in the absence of either a driving function or process noise. The matrix B relates to the operational control input to the state. The matrix C in the measurement equation relates the state to the measurement. The matrix D in the measurement equation relates the control input to the measurement. The real dynamic systems are subjected to a variety of "noise" signals that corrupt the response. The process noise $(w_{k-1})$ corrupts the states and the sensor noise $(_K)$ corrupts the output. The modified governing equations incorporating the effects of these exogenous inputs can be written as:

$$x_k = Ax_{k-1} + BU_{k-1} + Fw_{k-1} \text{ and } y_k = Cx_k + DU_k + \kappa.$$

The Kalman Filter operates under certain system assumptions. First, the state dynamics are linear, that is the current state is a linear function of the previous state. Secondly, the noise in the state dynamics is normally distributed. Thirdly, the observation process is linear, that is the observations are a linear function of the state. Finally, the assumption is made that the observation noise is normally distributed.

Although a prediction of the process noise ore the measurement noise values is problematic, some knowledge of their statistics is possible. Below are statements setting forth Process Noise and Measurement Noise. Since the mean load does not change under steady state driving conditions sample to sample, the state equation is:

$$x_k = x_{k-1} + w_{k-1}; \text{ i.e. } A = 1, B = 0, F = 1$$

And the output equation is:

$$y_k = x_k + -\kappa; \text{ i.e. } C = 1, D = 0$$

Figure 22A:
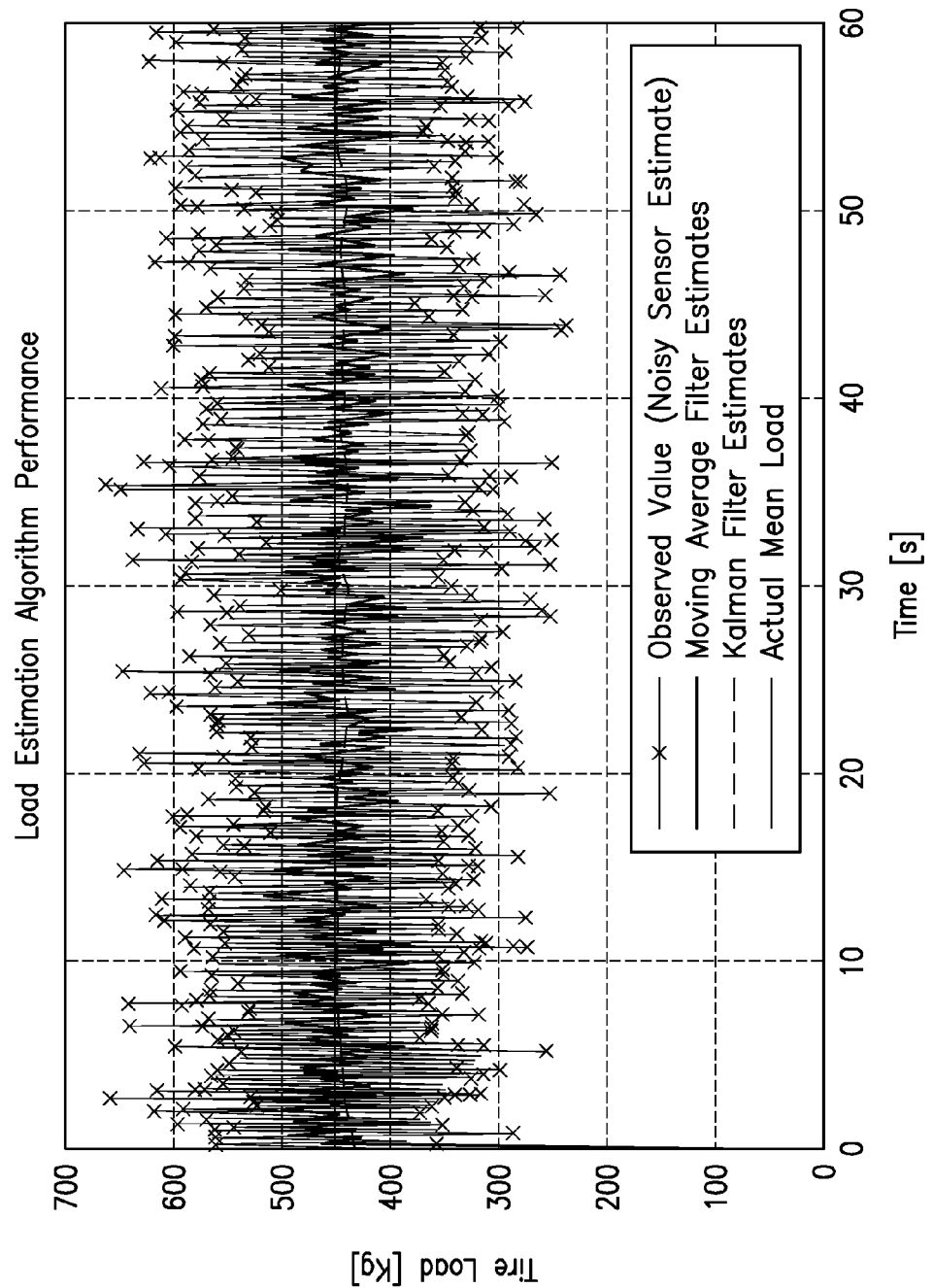
FIG. 22A is a graph of Load Estimation Algorithm performance vs. Tire Load for Case-1 Smooth Surface Condition.
Figure 22B:
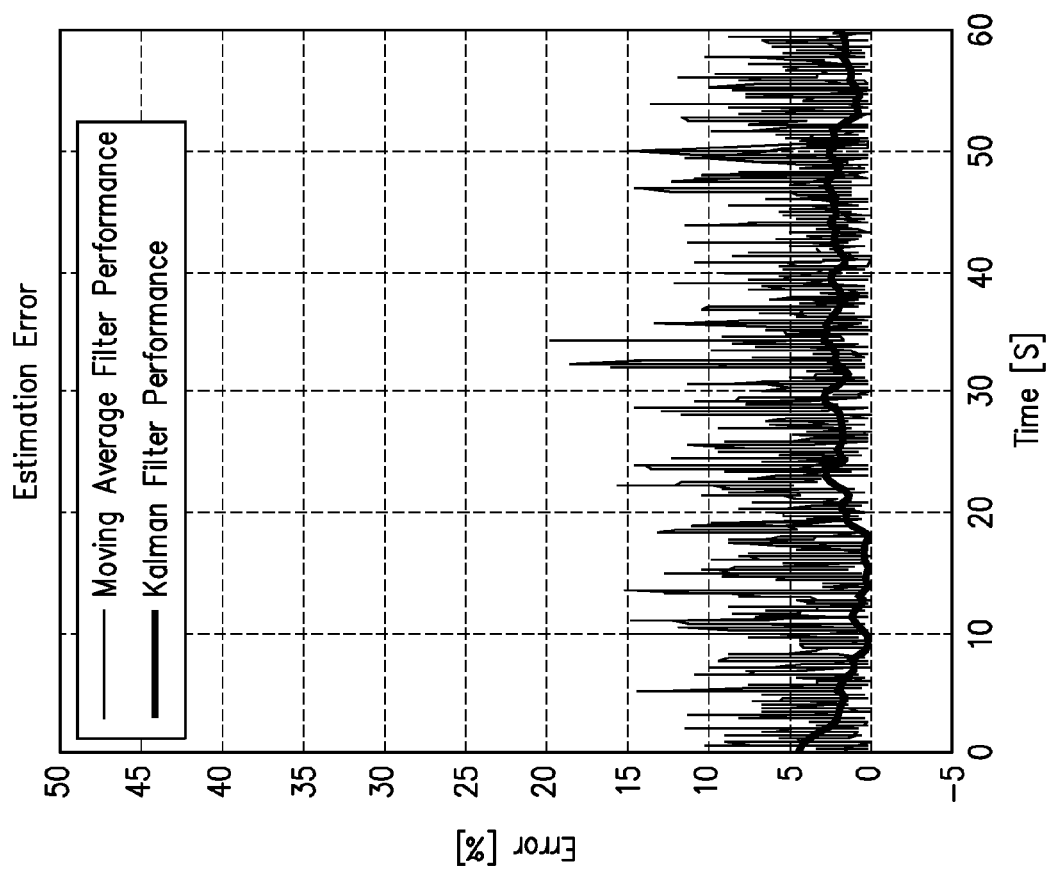
FIG. 22B is a graph of load Estimation Error over time showing Moving Average Filter performance vs. Kalman Filter Performance results.

The term $\theta_k$ represents measurement noise accounts for load variations. It is this parameter which can be made adaptive with knowledge about the roughness level. Following are a summary of the five Kalman Filter equations categorized as Prediction and Correction and the equation reduction for the purpose of exemplary explanation. In FIG. 21, a normal distribution curve is depicted in which the Mean=0 and a Standard deviation=X percent of average tire load, depending on the surface roughness level. Thus, x is approximately equal to 15 percent for a smooth surface; 25 percent for a rough surface and 35 percent for a very rough surface. Estimation results experimentally obtained are represented in FIG. 22A for a Case 1 Smooth Surface road condition. The graph of FIG. 22A shows the Load Estimation Algorithm Performance by graphing Tire Load over time comparing: Observed Value (Noisy Sensor Estimate), Moving Average Filter Estimates, Kalman Filter Estimates and Actual Mean Load. In FIG. 22B, Estimation Error between the Moving Average Filter Performance and the Kalman Filter Performance is shown graphically. The Kalman Filter provided a lower estimation error and an estimation within a 5 percent accuracy band for a static axle load.

Figure 23A:
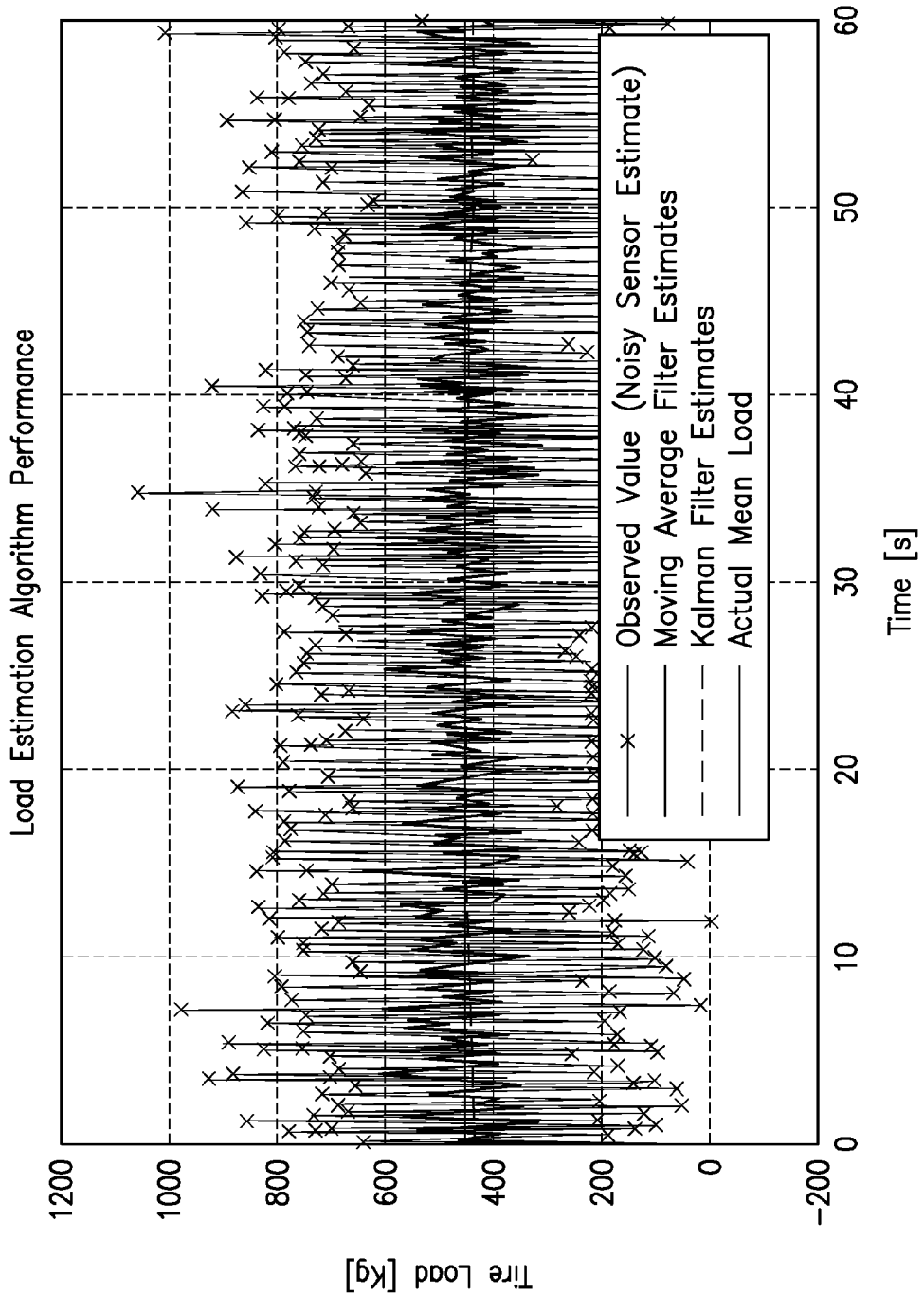
FIG. 23A is a graph of Load Estimation Algorithm performance vs. Tire Load for Case-2 Rough Surface Condition.
Figure 23B:
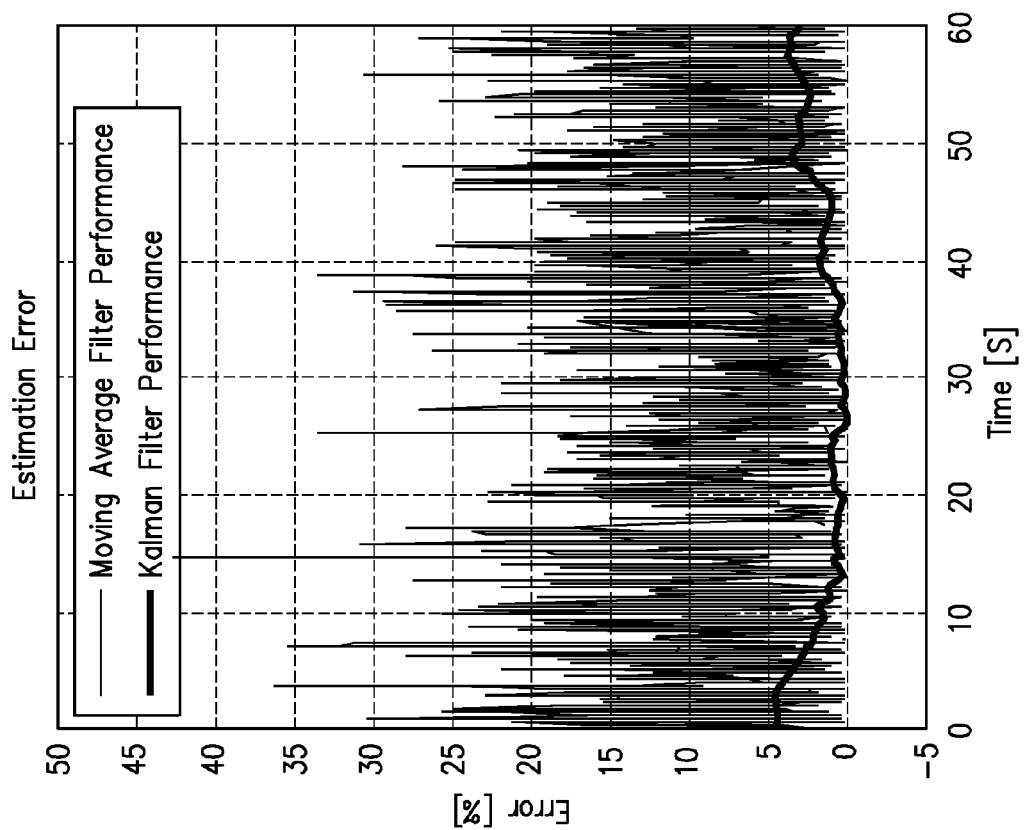
FIG. 23B is a graph of load Estimation Error as a percent over time showing Moving Average Filter performance vs. Kalman Filter Performance results in Case 2.

The Load Estimation Algorithm Performance on a Case 2 Rough Surface is shown graphically in FIG. 23A which compares Observed Value (Noisy Sensor Estimate), Moving Average Filter Estimates, Kalman Filter Estimates and Actual Mean Load. FIG. 23B shows the Estimation Error between the Moving Average Filter Performance and the Kalman Filter for the Case 2 Rough Surface. The Kalman Filter provided a lower estimation error than the Moving Average Filter and achieved an estimation within a 5 percent accuracy band for a static axle load on a rough surface.

Figure 24A:
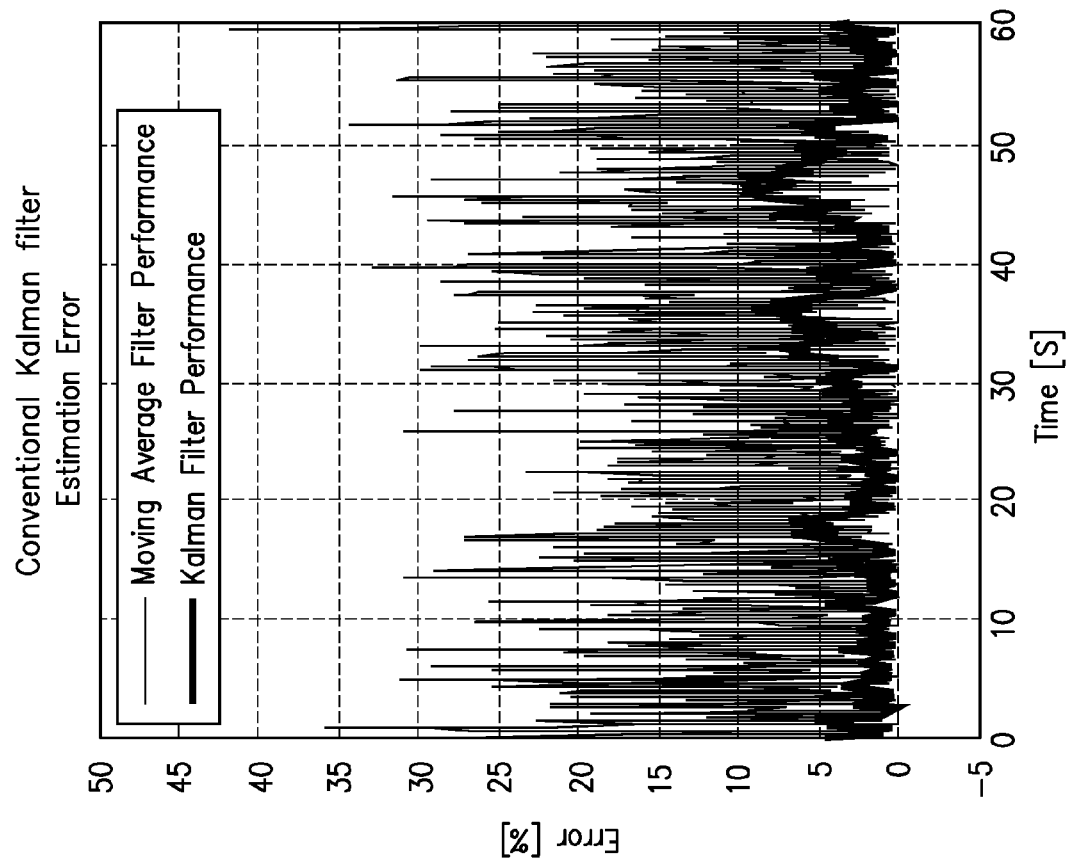
FIG. 24A is a graph of estimation error over time for a conventional Kalman filter.
Figure 24B:
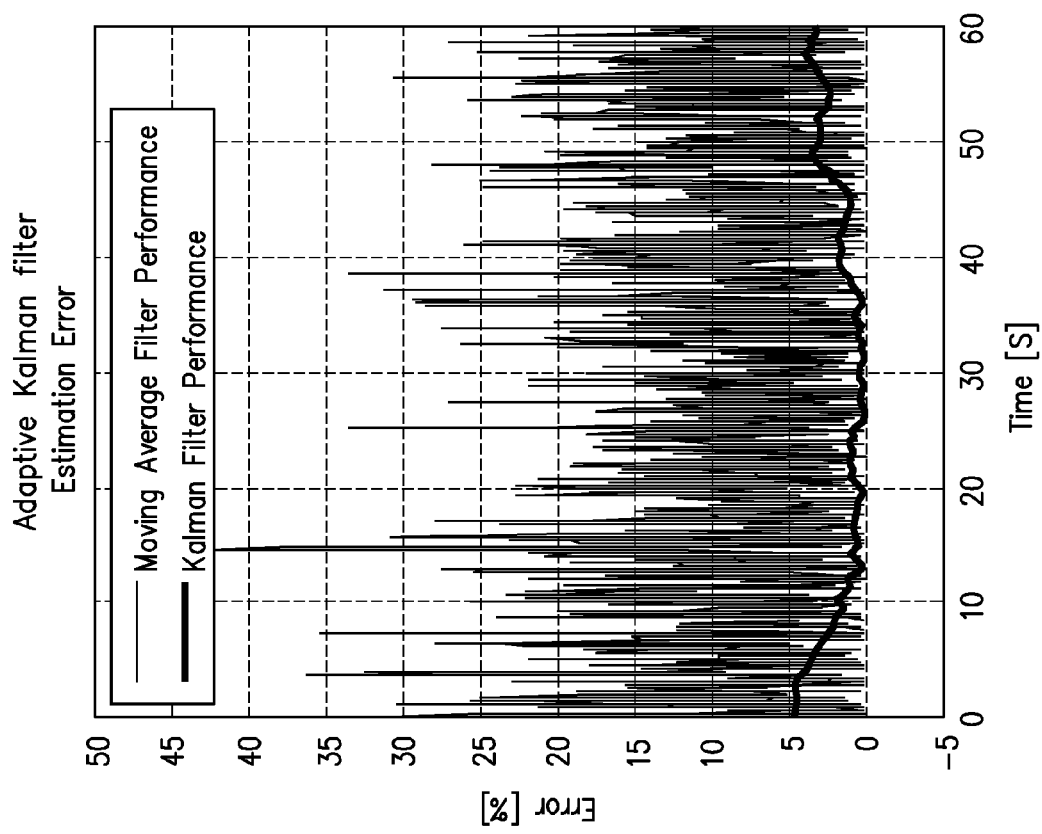
FIG. 24B is a graph of estimation error over time for an adaptive Kalman filter.

In FIG. 24A the Estimation Error for a conventional Kalman Filter using constant noise variance is shown, compared against the Moving Average Filter Performance. FIG. 24B shows a graph depicting an Adaptive Kalman Filter performance using a noise variance that changes as a function of the road roughness level. As seen in FIG. 24B, the Adaptive Kalman Filter performance is superior to that of a Moving Average Filter performance. By comparing Adaptive Kalman Filter performance of FIG. 24B to Conventional Kalman Filter performance of FIG. 24A, it will be appreciated that the Adaptive Kalman Filter performance results in a lower percentage error than the Conventional Kalman Filter. Accordingly, the graphs support the conclusion that using an Adaptive Kalman Filter that changes a noise variance to reflect a road roughness level achieves a superior predictive performance to a filter which uses a constant noise level.

Referring again to FIG. 25, the algorithm for predicting tire load utilizes one of the feature based approaches explained previously in application of the Surface Classification block 52. The Filter Parameters are thus tuned as a function of the road surface condition. So tuned, the Adaptive Kalman Filter will apply the adaptive filter parameters to the Raw Footprint Length Estimation 54 to create a Filtered Footprint Length. The Filtered Footprint Length can thereafter be used with tire identification and inflation pressure to derive from a Look-up table 58 a load estimation. As explained, the Adaptive Kalman Filter 54 is used because, for a conventional Kalman Filter application, the model statistic noise levels are given before the filtering process and will remain unchanged during the whole recursive process. Commonly, this a priori statistical information is determined by test analysis and certain knowledge about the observation type beforehand. If such a priori information is inadequate to represent the real statistic noise levels, conventional Kalman estimation is not optimal and may cause unreliable results. The subject system and method overcomes such a possibility through the use of adaptive filtering application.

From the foregoing, it will be appreciated that the subject algorithm of FIG. 25 uses a piezo-energy harvester signal for both load and road roughness estimation. Real world driving conditions are addressed through the application of road roughness during load estimation. Moreover, since the Kalman filter based approach is a recursive procedure, historical information does not need to be stored, a decided advantage over other methods such a moving average method. Additionally, a convention Kalman filter is relatively more sensitive to the selection of the dynamic model noise level which remains a constant. In the subject approach an adaptive Kalman filtering algorithm is used, resulting in a more robust load estimate which accounts for sudden changes to road roughness condition.

Figure 26:
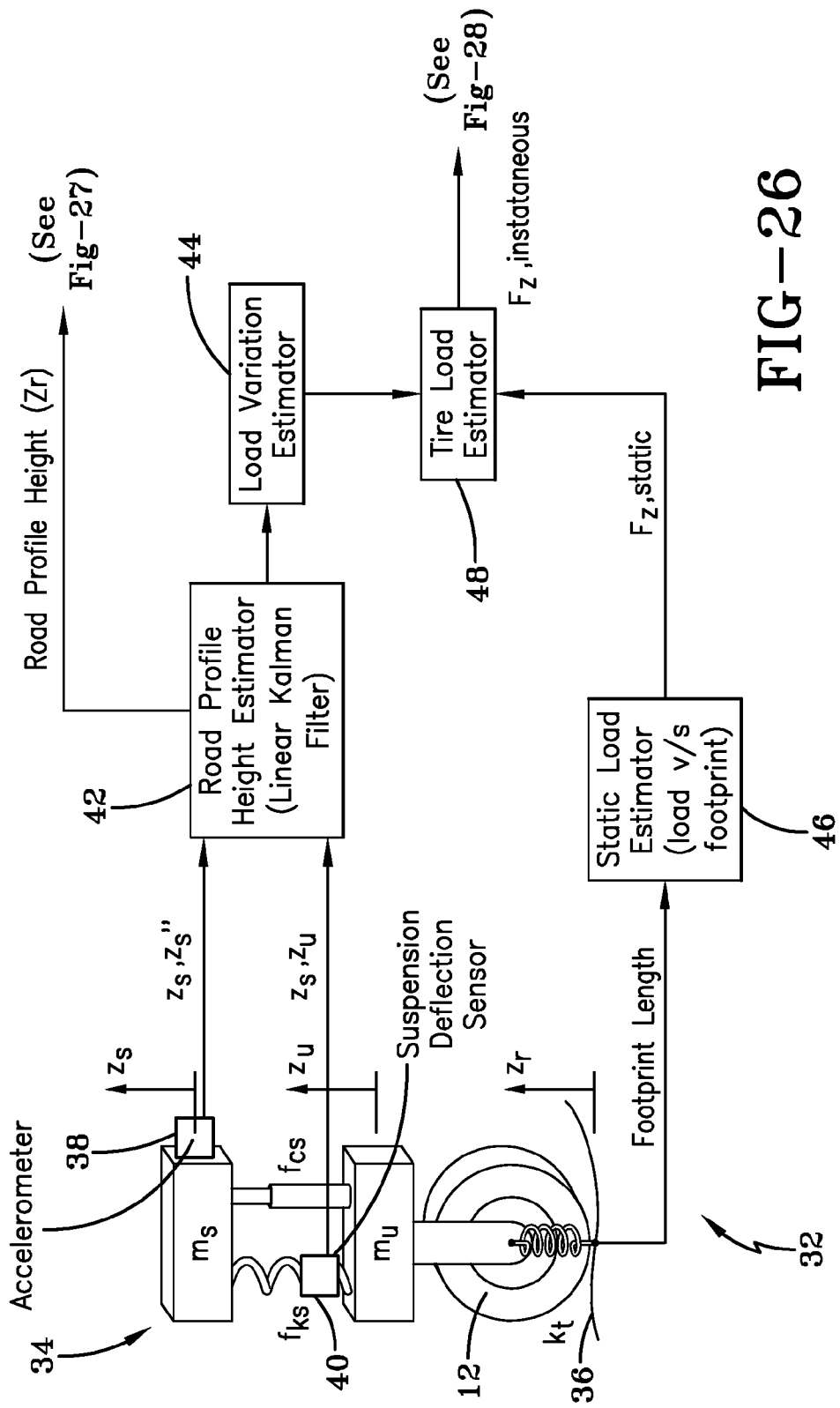
FIG. 26 is a data flow diagram of an alternative load estimation algorithm using a quarter-car vehicle model.
Figure 27:
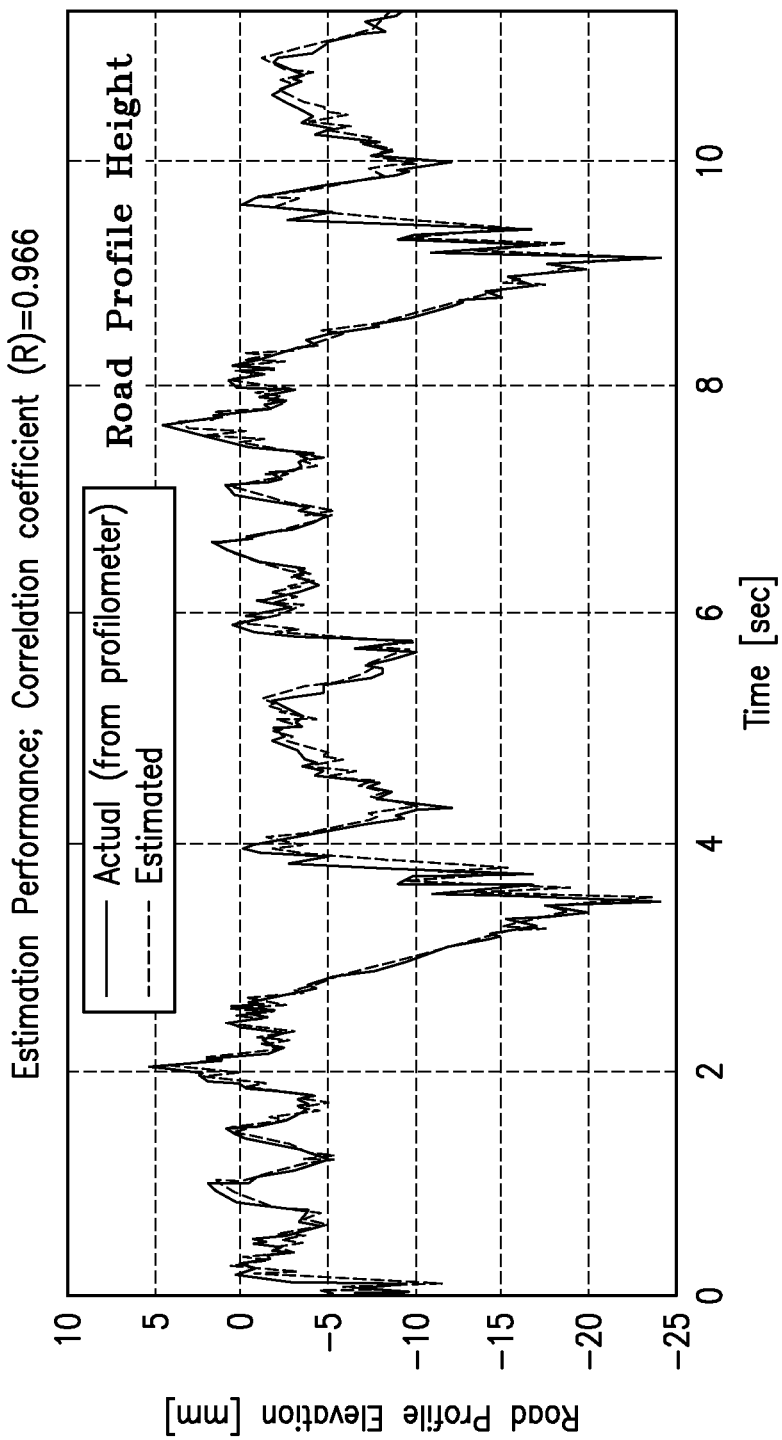
FIG. 27 is a graph of actual vs. estimated road profile elevation using the algorithm of FIG. 26, with a Correlation coefficient (R)=0.966.
Figure 28:
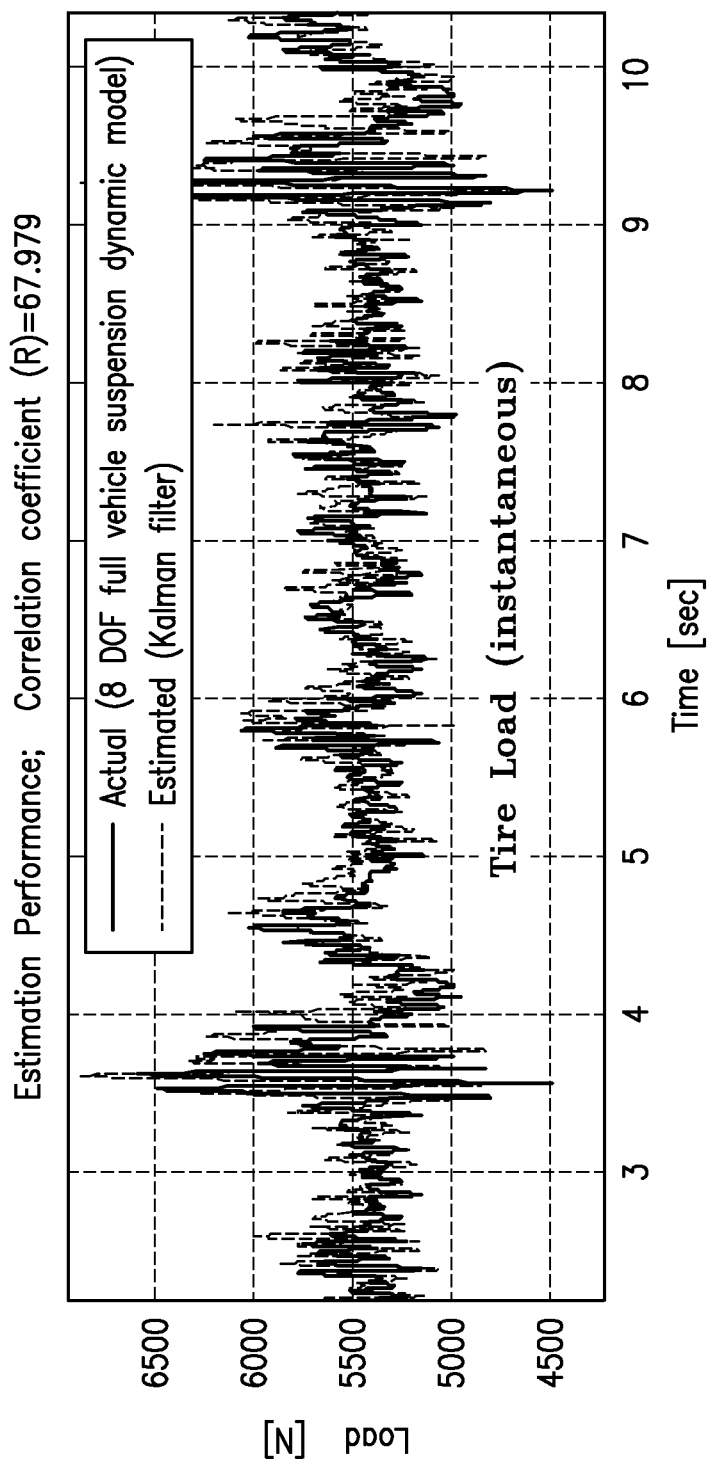
FIG. 28 is a graph of load over time comparing actual to estimated (using the Kalman filter) for a Correlation coefficient of 67.979.

FIGS. 26, 27 and 28 show an extension of the above approach to the encompass a road profile height estimation scheme in addition to an estimation of instantaneous tire load. FIGS. 26 through 28 relate to a road profile height estimation based on a multi-sensor fusion approach via Kalman Filter techniques and its application in an instantaneous tire load estimation algorithm. Road profile is seen as an essential input that affects vehicle dynamics data. An accurate estimate of road profile is thus useful in vehicle dynamics and control system design such as active and semi-active suspension design. The subject adaptation of FIGS. 26 through 28 provide for a road profile estimation that may be used for the purpose of vehicle control systems as well as in the estimation of a dynamic tire loading.

With regard to the road profile, a data flow diagram is set forth in FIG. 26 and uses a real-time estimation methodology based on use of a Kalman Filter. The method uses measurements from available sensors; accelerometers and suspension deflection sensors. Referring to FIG. 26, the algorithm 32 uses a quarter-car vehicle model 34. In the model 34:

$m_s$=sprung mass
$m_u$=unsprung mass
$K_{suspension}$=suspension stiffness
$C_{suspension}$=suspension dampening coefficient
$K_{tire}$=tire stiffness
$C_{tire}$=tire dampening coefficient
$Z_s$=sprung mass vertical displacement
$Z_u$=unsprung mass vertical displacement
$Z_r$=road profile height The standard notational convention for describing a State-space representations is given by:

x'=A x+B u} state equations
y=C x+D u} output equations where:
x(t) State vector
x'(t) Derivative of state vector
A State matrix
B Input matrix
u(t) Input vector
y(t) output vector
C output matrix
D Direct transmission matrix The equivalent state space representation of the "quarter car model" used in the Kalman filter has been specified below as:

$$A = [0\ 1\ 0\ 0\ 0\ 0;$$
$$-K_{suspension}/m_s -$$
$$C_{suspension}/m_s\ K_{suspension}/m_s\ C_{suspension}/m_s\ 0\ 0;$$

$$0\ 0\ 0\ 1\ 0\ 0;$$
$$K_{suspension}/m_u\ C_{suspension}/m_u - ((K_{suspension}/m_u) + (K_{tire}/m_u)) -$$
$$(C_{suspension} + C_{tire})/m_u\ K_{tire}/m_u\ C_{tire}/m_u$$
$$0\ 0\ 0\ 0\ 0\ 1;$$
$$0\ 0\ 0\ 0\ 0\ 0]; B = [0;$$
$$0;$$
$$0;$$
$$0;$$
$$0;$$

$$0];$$
$$C = [1\ 0\ -1\ 0\ 0\ 0;$$
$$-K_{suspension}/m_s - C_{suspension}/m_s\ K_{suspension}/m_s\ C_{suspension}/m_s\ 0\ 0];$$
$$D = [0;$$
$$0;$$
$$0];$$

An accelerometer 38 and suspension deflection sensor 40 of commercially available type are affixed to the vehicle and respectively measure the chassis acceleration ($Z_s''$) and the suspension deflection ($Z_s-Z_u$). Estimated states of the Kalman Linear filter are $Z_s$, $Z_s'$, $Z_u$, $Z_u'$, $Z_r$ and $Z_r'$. The Kalman Filter 42 generates an estimate of the Road Profile Height ($Z_r$) and that further is used to estimate the tire load variation caused due to road undulations. The load variation is given by the expression $F_z$, load variation=$[K_{tire}*(Z_u-Z_r)+C_{tire}*(Z_u'-Z_r')]$.

The Kalman filtering approach allows the achievement of a successful estimation by overcoming the vibrational disturbances that heavily affect the accelerometers. The quarter-vehicle modeling enables the use of a real time estimation methodology. A secondary use of the road profile height estimation is in the calculation of a load (instantaneous) on the tire. An axle load variation estimator 44 receives the road profile height estimation from the Kalman Filter 42 and directs an axle load variation estimation to a tire load estimator 48. The footprint length of the tire 12 is obtained from implementation of the methodology described previously. A static load estimator 46 receives a piezo-sensor signal from the tire 12 and estimates a static load $F_z$ on the tire. The static load is used by the tire load estimator 48 along with the load variation estimation. From a fusion of the static load estimate and the load variation estimate, the tire load estimator 48 calculates $F_z$, the instantaneous load on the tire.

$F_z$, instantaneous=$F_z$ static-$F_z$, load variation $$F_z, \text{instantaneous} = F_z, \text{static} - [K_{tire} * (Z_u - Z_\Gamma) + C_{tire} * (Z_u^* - Z_\Gamma^*)]$$

FIG. 27 shows a graph (road profile elevation over time) reflecting experimental results comparing actual road estimation (via a profilometer) to estimated road profile estimation using the system of FIG. 26. A close correlation coefficient (R)=0.966 verifies the validity of the subject methodology and system in generating a quantified road profile estimate. In FIG. 28, a graph (Load over time) reflecting experimental results between actual load (8 Degrees of Freedom full vehicle suspension dynamic model) and estimated load (Kalman filter) is presented. The graph indicates a correlation coefficient (R)=67.979, whereby validating the subject system and approach of FIG. 26.

The tire normal load is assumed to be directly related to the contact forces between the tire and the load. The measure of tire load can therefore be useful to implement control strategies oriented to the maximization of the road-holding performance of the vehicle. Moreover, the information of global load and the load distribution between all tires on a vehicle may be used by advanced brake control systems like the electronic brake distribution (EBD) system to optimize system performance and reduce vehicle stopping distance. In the case of a commercial vehicle, the weight estimated on each wheel could be averaged to produce an estimate of the vehicle weight which can then be broadcast to a central location, whereby eliminating the need for weigh stations. The road roughness methodology of FIGS. 1 through 25 as discussed above and the road profile discussion pertaining to FIGS. 26 through 28 are related insomuch as road roughness may be considered as micro-road profile changes and road profile change may be considered as a macro-road roughness variation. Use of both or either macro (road profile) and micro (road roughness) variable estimations in an adaptive Kalman Filter analysis will result in a more robust and accurate estimation and thus more closely reflect real-driving conditions.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A dynamic load estimation system for estimating a vehicle load comprising:
at least one tire supporting a vehicle;
tire sensor means mounted to the one tire, the sensor means operable to measure a tire deformation of the one tire and generate a load-indicative raw signal conveying measured deformation data;
load estimation means for determining an unfiltered load estimation on the tire from the load-indicative raw signal;
road roughness estimation means for determining a road roughness estimation;
filtering means for filtering the unfiltered load estimation by the road roughness estimation; and
load estimation means for determining a filtered load estimation on the one tire from the filtering means.

2. The load estimation system of claim 1, wherein the tire sensor means comprises energy harvesting means, the load-indicative raw signal representing energy harvested from deformation of the one tire.

3. The load estimation system of claim 1, wherein the tire sensor means comprises at least one piezo-based sensor.

4. The load estimation system of claim 1, wherein the filtering means comprises an adaptive filtering means.

5. The load estimation system of claim 4, wherein the adaptive filtering means comprises an adaptive Kalman filter using a recursive-based procedure.

6. The load estimation system of claim 5, wherein the load estimation means determines an estimated unfiltered footprint length of the tire from the load-indicative raw signal.

7. The load estimation system of claim 6, wherein the adaptive Kalman filter determines a filtered footprint length estimation from the estimated unfiltered footprint length.

8. The load estimation system of claim 7, further comprising a tire-specific database determining a load estimation on the one tire from inputs comprising the filtered footprint length estimation, measured tire inflation pressure and tire identification data.

9. The load estimation system of claim 8, wherein the road roughness estimation means operatively applying a surface roughness classification system to the load-indicative raw signal to determine a relative road roughness estimation, the adaptive filtering means being operative to filter the estimated unfiltered footprint length by the relative road roughness estimation.

10. The load estimation system of claim 5, wherein further comprising road profile height estimating means for determining an estimated quantified road profile height from at least one vehicle-mounted sensor means.

11. The load estimation system of claim 10, wherein the vehicle-mounted sensor means comprises suspension deflection measuring means.

12. The load estimation system of claim 11, wherein the vehicle mounted sensor means further comprises chassis mounted accelerometer means for measuring vehicle chassis acceleration.

13. The load estimation system of claim 12, wherein an estimated road profile height is operatively fused with the filtered load estimation to yield a calculated instantaneous tire load estimation.

14. A method of estimating a dynamic load on a vehicle supporting tire comprising:
mounting tire sensor means to the one tire, the sensor means operable to measure a tire deformation of the one tire and generate a load-indicative raw signal conveying measured deformation data;
determining a road roughness estimation from road roughness estimation means utilizing the load-indicative raw signal;
calculating an unfiltered load estimation from the load-indicative raw signal;
filtering the unfiltered load estimation by the road roughness estimation utilizing adaptive filter means; and
estimating a filtered load estimation on the one tire subsequent to filtering by the adaptive filter means.

15. The method of claim 14, wherein further comprising configuring the tire sensor means as an energy harvesting sensor means to generate the load-indicative raw signal.

16. The method of claim 15, wherein the adaptive filtering means comprises an adaptive Kalman filter using a recursive-based procedure.

17. The method of claim 16, further comprising determining, by means of a tire-specific database, a load estimation on the one tire from inputs comprising the filtered footprint length estimation, measured tire inflation pressure and tire identification data.

18. The method of claim 17, wherein further comprising applying a surface roughness classification system to the raw load-indicating signal to determine a relative road roughness estimation and filtering by means of the adaptive filtering means an unfiltered tire load estimation by the relative road roughness estimation.

19. The method of claim 16, wherein further comprising calculating a road profile estimation from at least one vehicle-mounted sensor means.

20. The method of claim 19, wherein further comprising fusing an estimated road profile height with the filtered load estimation to yield a calculated instantaneous tire load estimation.

* * * * *